(12) United States Patent
Bonora

(10) Patent No.: US 12,487,446 B2
(45) Date of Patent: Dec. 2, 2025

(54) ADAPTIVE OPTICAL DEVICE

(71) Applicant: DYNAMIC OPTICS S.R.L., Sarcedo (IT)

(72) Inventor: Stefano Bonora, Padua (IT)

(73) Assignee: DYNAMIC OPTICS S.R.L., Sarcedo (IT)

( * ) Notice: Subject to any disclaimer, the term of this patent is extended or adjusted under 35 U.S.C. 154(b) by 628 days.

(21) Appl. No.: 17/790,184

(22) PCT Filed: Dec. 29, 2020

(86) PCT No.: PCT/IB2020/062511
§ 371 (c)(1),
(2) Date: Jun. 30, 2022

(87) PCT Pub. No.: WO2021/137149
PCT Pub. Date: Jul. 8, 2021

(65) Prior Publication Data
US 2022/0357569 A1  Nov. 10, 2022

(30) Foreign Application Priority Data

Dec. 30, 2019 (IT) ................ 102019000025795

(51) Int. Cl.
*G02B 26/00* (2006.01)
*G02B 3/14* (2006.01)
(Continued)

(52) U.S. Cl.
CPC ............. *G02B 26/004* (2013.01); *G02B 3/14* (2013.01); *G02B 7/04* (2013.01); *A61B 3/04* (2013.01)

(58) Field of Classification Search
CPC ...... G02B 3/14; G02B 26/004; G02B 26/005; G02B 3/12; G02B 7/04
See application file for complete search history.

(56) References Cited

U.S. PATENT DOCUMENTS 4,890,903 A   1/1990   Treisman et al.
6,930,817 B2 * 8/2005   Srinivasan ........... G02B 5/1861
                                                    359/295

(Continued)

FOREIGN PATENT DOCUMENTS

EP   3100079 A1   12/2016
WO   2015052233 A1   4/2015
WO   2018167739 A1   9/2018

OTHER PUBLICATIONS

"Vol. N." Oxford English Dictionary, Oxford UP, Mar. 2025, https://doi.org/10.1093/OED/5946620514. (Year: 2025).*

(Continued)

*Primary Examiner* — Christopher Stanford
(74) *Attorney, Agent, or Firm* — Rivka Friedman

(57) ABSTRACT

Adaptive optical device provided with a deformable lens including a membrane which is extended between a first end and an opposite second end and is provided with an internal face placed on an optical layer. In addition, the deformable lens includes actuators arranged for varying the curvature of the membrane with respect to the optical axis of the lens. The actuator comprises a first movement member and a second movement member movable parallel to the optical axis and connected, respectively, to the first end and to the second end of the membrane, and a drive member operatively connected to the first and to the second movement member and arranged to move them by moving the first end and the second end of the first membrane parallel to the optical axis, in order to place the first membrane in a curved configuration.

10 Claims, 10 Drawing Sheets

(51) Int. Cl.
*G02B 7/04* (2021.01)
*A61B 3/04* (2006.01)

(56) References Cited

U.S. PATENT DOCUMENTS

| | | | |
|---|---|---|---|
| 7,098,871 B1 | 8/2006 | Tegreene | |
| 7,602,557 B2 | 10/2009 | Berge et al. | |
| 8,199,410 B2* | 6/2012 | Haugholt | G02B 3/14 |
| | | | 359/666 |
| 8,390,939 B2* | 3/2013 | Henriksen | G03B 3/10 |
| | | | 359/694 |
| 8,879,160 B2* | 11/2014 | Bolis | G02B 26/0825 |
| | | | 359/666 |
| 9,164,202 B2* | 10/2015 | Batchko | G02B 3/12 |
| 9,377,629 B2* | 6/2016 | Lee | H04N 13/305 |
| 10,852,553 B2* | 12/2020 | Pedder | G02B 3/12 |
| 2010/0208357 A1 | 8/2010 | Batchko et al. | |
| 2011/0158617 A1* | 6/2011 | Svardal | G03B 5/02 |
| | | | 396/55 |
| 2017/0017019 A1 | 1/2017 | Bolis | |

OTHER PUBLICATIONS

Strumer Moritz et al.: "Cylindrical lens with integrated piezo actuation for focal length tuning and lateral scanning", 2014 IEEE 27th International Conference on Micro Electro Mechanical Systems (MEMS), IEEE, Jan. 26, 2014 (Jan. 26, 2014), pp. 1171-1174, XP032579128, DOI: 10.1109/MEMSYS.2014.6765855 [retrieved on Mar. 11, 2014].

* cited by examiner

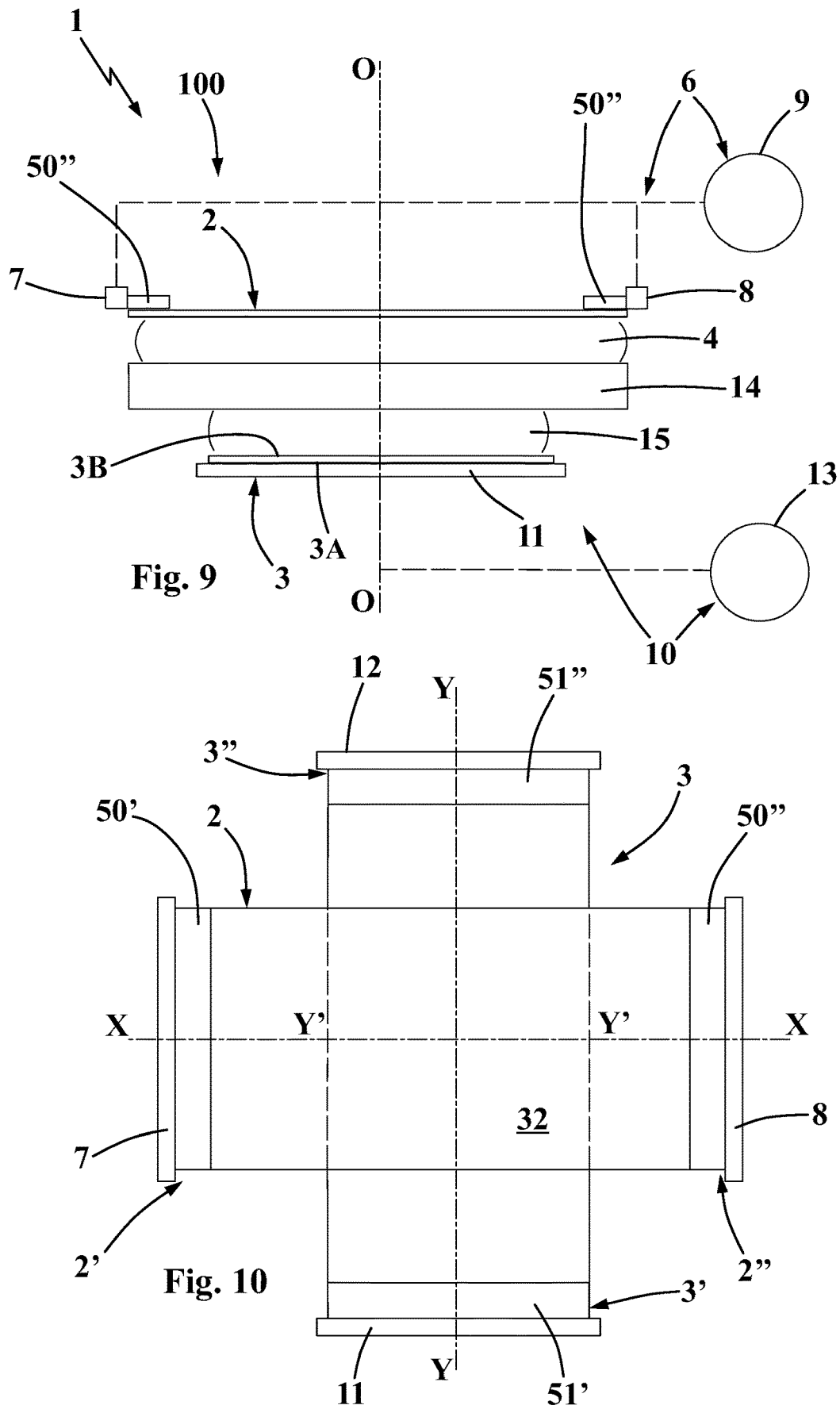

ADAPTIVE OPTICAL DEVICE

FIELD OF APPLICATION

The present invention regards an adaptive optical device according to the preamble of the independent claim 1.

The present optical device is advantageously inserted in the field of production of devices for the refraction of light, and in general of optical devices employable for example as test eyeglasses, photography optical devices, such as for example camera lenses or in the field of production of diagnostics instrumentation for optics and orthoptics such as for example phoropters.

In particular, the present device can be provided with a deformable lens in order to modify a wavefront of the light that traverses it so as to meet different application requirements of the same device, for example in order to define a different focal point for a different focusing.

STATE OF THE ART

For some time in the field of production of optical devices, adaptive optical devices have been known that are provided with lenses intended to be traversed by a light beam in order to refract the light with a variable wavefront, for example in order to converge such light beam towards a specific point at a pre-established focal distance.

As is known, the adaptive optical devices are normally provided with a deformable lens, defining a curvature with respect to a focal axis thereof. Such curvature is modifiable so as to vary the aforesaid wavefront on the basis of the specific application.

More clearly, such deformable lenses of the devices of known type are widely used in many technical fields of production of adaptive optical devices, such as for example the objectives of cameras, commonly used today and mounted in any cellular phone, and they are capable of varying the focal distance automatically so as to vary the focusing of the object to be photographed.

Such adaptive optical devices also have wide application in the field of production of diagnostic instruments usually used by optics, orthoptics or eye doctors in order to diagnose pathologies of patients. Such instruments are normally known in the technical jargon of the field with the name of phoropters, and in particular electronic phoropters. Such adaptive optical devices also have application in the fields of imaging of the retina, for example for compensating for the aberrations of the eye, such as for example defocus and/or astigmatism; they also have application for example in microscopes, and for focusing laser sources in a controlled manner. As is known, the adaptive optical devices normally comprise at least one aforesaid deformable lens provided with an optical axis.

The optical axis is, in a manner per se known to the man skilled in the art of the field, defined as a straight line along which there is a symmetry of rotation for the lens, and it defines an ideal trajectory of the light that traverses the lens itself. Normally, the optical axis also comprises the focal point, or focus, in the technical jargon of the field.

The deformable lenses of the adaptive optical devices of known type conventionally comprise a membrane that is transparent and elastically deformable, facing a support wall that is substantially flat and transparent.

Between the membrane and the support wall, a chamber is defined which houses an optical layer, normally transparent, which defines the refraction body of the lens. Normally, the optical layer is an optical fluid, susceptible of acquiring the shape of the chamber with variation of the shape of the membranes.

One example of an adaptive optical device of known type is described in the document WO 2015/052233. Such device of known type comprises in particular a membrane composed of an elastomeric transparent material. In addition, the device described herein comprises movement means comprising a rigid ring connected perimetrically to the membrane and operatively connected to an actuator, which pushes the edge of such membrane, deforming it, in a manner so as to create a spherical surface in its central zone, within the aforesaid ring of the movement means.

Such device of known type, briefly described above, has in practice shown that it does not lack drawbacks.

The main drawback lies in the fact that it is not possible to create lenses with large aperture, since by increasing the planar extension of the lens, this is more affected by gravity, defining undesired deformations.

More in detail, the polymer material which composes the elastic membrane is easily deformable and is subjected to the force of gravity, which tends to move the optical fluid within the chamber, further deforming the membrane. Such additional and undesired deformation decreases the optical quality of the lens, forming optical aberrations for the light that traverses the lens. This deformation is greater the larger the diameter of the membrane. In this situation, it is known to make lenses of polymer material for adaptive optical devices with maximum diameter of about 15 mm.

A further example of an adaptive optical device of known type is described in the document U.S. Pat. No. 7,602,557.

The device described herein comprises a deformable lens which comprises two transparent containment walls. Between such walls, a chamber is defined in which two different optical liquids are housed, immiscible with each other, provided with two different corresponding refraction indices. Between the two liquids, at a common contact surface thereof, a meniscus is defined which defines the curvature of the lens itself.

The device of known type provides for electrical power supply means, connected to the containment walls in order to generate at least one electric field at the optical fluids. Such fluids, with the variation of the electric field, vary their wettability angle. Consequently, upon varying the wettability angle, the curvature of the meniscus defined between the two fluids themselves also varies, in fact changing the curvature of the deformable lens.

Also the latter device of known type, briefly described above, has in practice shown that it does not lack drawbacks.

Also in this case, the main drawback is that of being limited to a size of the lens of at most about 15 mm diameter, since also the two liquids are subject to the force of gravity that tends to form aberrations by moving, in an undesired manner, the liquids within the chamber.

In order to at least partially overcome the drawbacks of the abovementioned prior art, deformable lenses are known which comprise actuator means, in particular piezoelectric, mechanically associated with a membrane in order to move it—such membrane made of more rigid material than the above-described polymer—into different deformation configurations so as to model the optical fluid and consequently modify the body of the lens.

Known for example from patent US 2010/208357 is a deformable lens in which the actuator means are the aforesaid devices mechanically fixed to the membranes.

As is known, the piezoelectric devices are compounds of polarizing material that, when electrically power supplied and in particular subjected to an electric voltage, are susceptible of being elastically deformed, for example by being elongated, in order to then return to the initial shape once the electrical power supply has terminated.

For such purpose, the lens of known type described herein comprises at least one electrical generator, which is connected to the piezoelectric devices and is configured to power supply them with a preset electric voltage, suitable for modifying the curvature of the membrane mechanically fixed thereto.

More in detail, the membranes of the deformable lens of known type described in this document have substantially circular shape, they face each other and define the chamber, with cylindrical shape, in which the optical fluid is housed. The piezoelectric devices have substantially annular shape and engage the membranes at their perimeter edges.

In this manner, the deformation of the piezoelectric devices in annular expansion allows deforming the circular membranes at the edges.

In addition, in order to allow the fluid within the chamber, the deformable lens of known type also comprises a separator ring, interposed between the two membranes at their perimeter edge and delimits, with an internal cylindrical face thereof, the chamber for the optical fluid.

More in detail, the separator ring is made of an elastically deformable material and susceptible of being moved between rest configuration and a compression configuration, in which it pushes the membranes mutually closer or away from each other so as to vary the shape of the lens.

The adaptive optical device of known type, briefly described above, has in practice demonstrated that it does not lack drawbacks.

The main drawback of the optical device of known type lies in the fact that the piezoelectric devices of the actuator means allow moving the membranes for a very reduced distance, limited by the capacity of deformation of the piezoelectric device itself and by the rigidity of the membrane, in particular in the case of glass membrane. In particular, the device of known type at most allows a movement of the membrane of several tens of microns.

A further drawback lies in the fact that the use of the fluid within the elastic membranes leads, over time, to an undesired deformation of the membranes, if made of easily deformable material, due to the force of gravity that tends to drive the liquid downward, deforming the membranes and causing critical aberrations.

A further drawback of the adaptive optical device of known type lies in the fact that by deforming the membrane so as to obtain a spherical cap geometry is hard to achieve, since it is limited to relatively small deformations and often runs the risk of aberrations in the wavefront of the light that exits from the lens of the device itself.

A further drawback lies in the fact that the piezoelectric devices of the actuator means for moving the membranes are very costly and difficult to make.

A further drawback lies in the fact that in order to attain different adjustments with the same deformable lens, it is necessary to mount different piezoelectric devices, each provided with different power supply means configured for electrically power supplying the corresponding device with a predetermined voltage.

Such configuration is very complex and difficult to install, considerably increasing the production and mounting costs.

In order to at least partially overcome the drawbacks of the deformable lenses of known type, briefly described above, a deformable lens is known from patent EP 3100079 that is provided with the aforesaid actuator means comprising piezoelectric devices with variable power supply. More clearly, each piezoelectric device is electrically connected to a variable power supply source configured for generating different power supply voltages based on the type of geometry to be formed.

In this manner, each piezoelectric device, with each different power supply voltage, is moved into a corresponding different configuration, compressing and moving the membranes into different corresponding positions.

Also the latter adaptive optical device of known type briefly described above has in practice demonstrated that it does not lack drawbacks.

The main drawback remains the fact that the piezoelectric devices of the actuator means allow moving the membranes for a very reduced distance, limited by the capacity of deformation of the piezoelectric device itself.

In particular, the piezoelectric devices of the devices of known type only allow a deformation of the membranes of a few micrometers.

In this situation, the adaptive optical devices of known type do not allow a wide adjustment, which very much limits their applicability.

A further drawback lies in the fact that the variable high-voltage power supply source is extremely costly, increasing the total cost of production of the device.

PRESENTATION OF THE INVENTION

In this situation, the problem underlying the present invention is therefore that of eliminating the drawbacks of the present prior art, by providing an adaptive optical device which allows a wide adjustment of focal distance.

A further object of the present invention is to provide an adaptive optical device which allows a simple control of the adjustment actuators.

A further object of the present invention is to provide an adaptive optical device which is structurally simple and inexpensive to make.

A further object of the present invention is to provide an adaptive optical device which allows controlling the focusing.

A further object of the present invention is to provide an adaptive optical device which allows controlling the astigmatism.

A further object of the present invention is to provide an adaptive optical device which is entirely safe and reliable in operation.

A further object of the present invention is to provide an adaptive optical device which does not require frequent maintenance operations.

BRIEF DESCRIPTION OF THE DRAWINGS

The technical characteristics of the invention, according to the aforesaid objects, are clearly seen in the contents of the below-reported claims and the advantages thereof will be more evident in the following detailed description, made with reference to the enclosed drawings, which represent a merely exemplifying and non-limiting embodiment of the invention, in which:

FIG. 9 shows a front axonometric schematic view of the adaptive optical device, object of the present invention, in a fourth embodiment thereof;

FIG. 10 shows a top plan schematic view of the present adaptive optical device, in the aforesaid fourth embodiment;

DETAILED DESCRIPTION OF A PREFERRED EMBODIMENT

Figure 1:
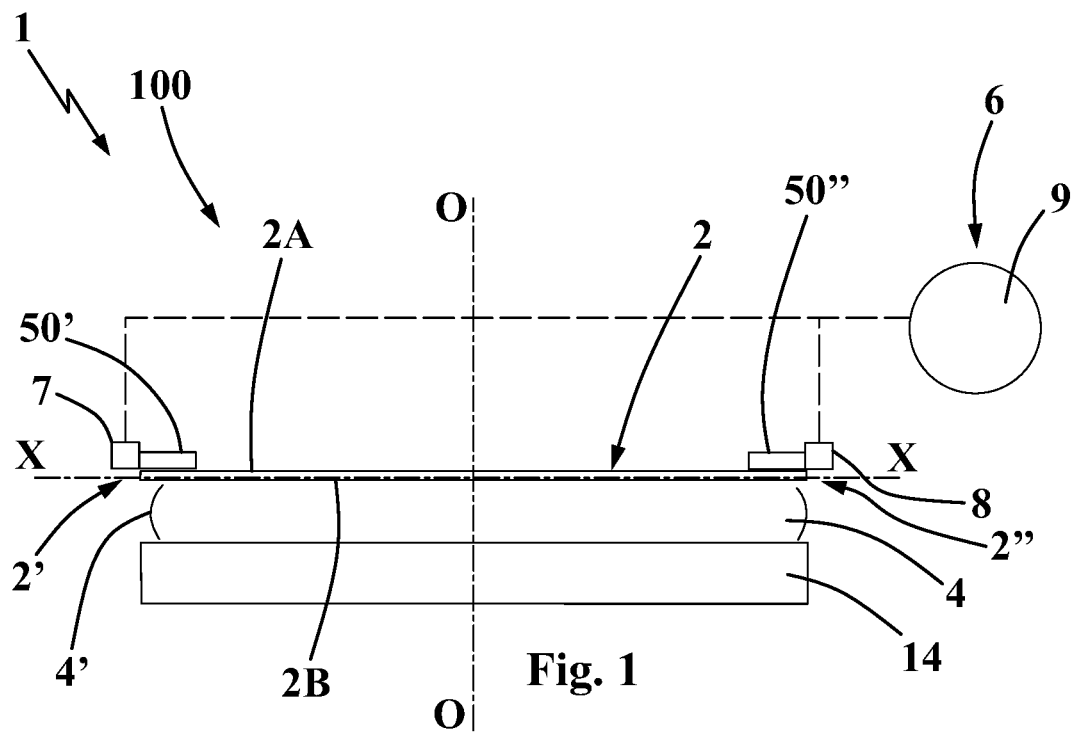
FIG. 1 shows a front axonometric schematic view of an example of the adaptive optical device, object of the present invention, in a first embodiment thereof.
Figure 2:
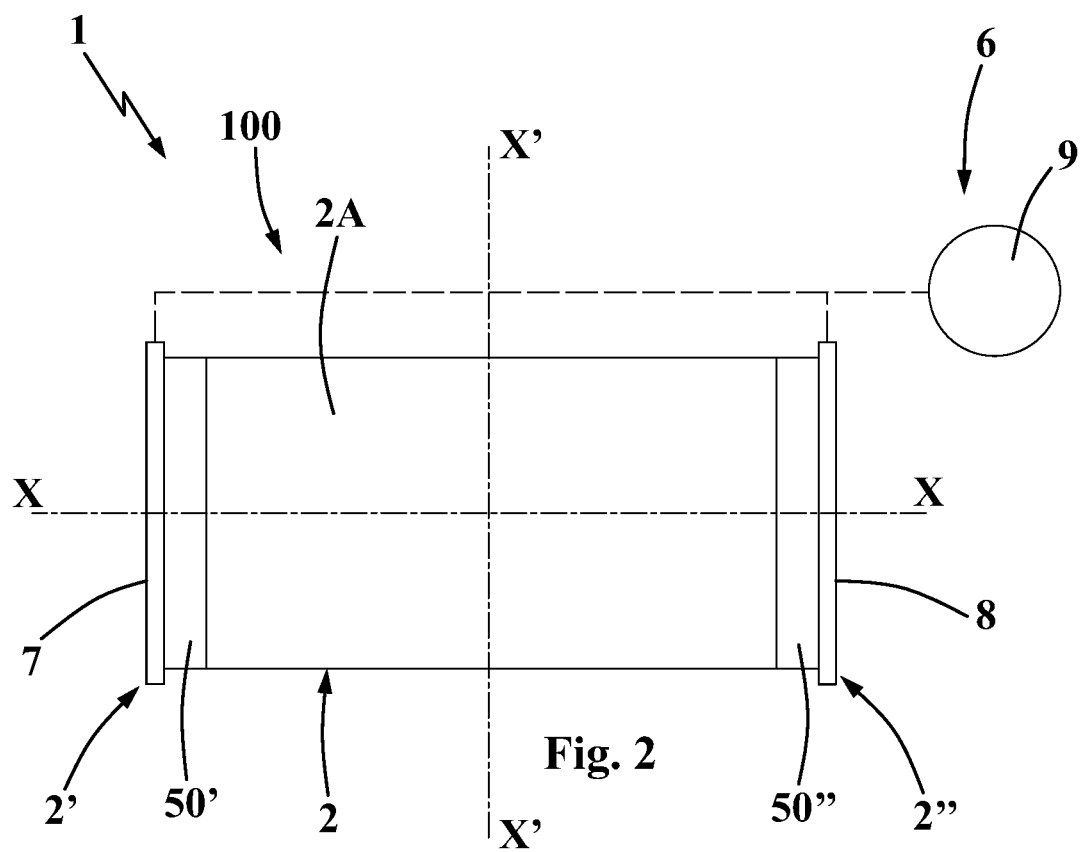
FIG. 2 shows a top plan schematic view of the present adaptive optical device, in the aforesaid first embodiment.

With reference to the enclosed drawings, reference number 1 overall indicates an example of an adaptive optical device, object of the present invention.

The adaptive optical device 1, object of the present invention, is advantageously inserted in the field of productions of devices for the refraction of light.

More generally the adaptive optical device is advantageously employable in eyeglass optical devices, such as for example test eyeglasses, in order to selectively vary the focal distance of the lenses of the eyeglasses themselves and determine the type of corrective lenses required by the patient.

Otherwise, the adaptive optical device 1, object of the present invention, can be advantageously employed in photography optical devices, such as for example the lenses of cameras or in the field of production of diagnostic instrumentation for optics and orthoptics such as for example the phoropters, so as to obtain a quick and/or automatic focusing following the actuation of actuator means (described in detail hereinbelow).

The adaptive optical device 1 can for example be used in a fundus camera for compensating for the aberrations of the eye under examination.

In addition, the adaptive optical device 1, object of the present invention, can be used in the technical field of microscopy and in the technical field of lasers, for example within laser sources or in optical chambers intended to be traversed by a laser source.

In general, the present device 1 can be employed for modifying a wavefront of the light that traverses it so as to meet different application requirements of the same device, in particular in order to define a focal point for a different focusing.

The adaptive optical device 1, object of the present invention, comprises at least one deformable lens 100 provided with an optical axis O.

As is well known in the technical field of optical devices, the optical axis of a lens is uniquely defined as that straight line along which there is a symmetry of rotation for the optical device itself, such as for example a photographic objective or a microscope. In other words, the optical axis is the line that defines the direction of the light through the lens, which passes through the center of curvature of the lens itself and coincides, in the case of lens with spherical cap geometry, with the axis of rotational symmetry.

The lens 100 of the device 1 comprises a first membrane 2, transparent and deformable, which intercepts the optical axis O, is extended, at least along a first direction X substantially orthogonal to the optical axis O itself, between a first end 2' and an opposite second end 2", and is provided with a first external face 2A and a first internal face 2B opposite the first external face 2A.

Advantageously, the ends 2', 2" of the first membrane 2 are extended along a first transverse direction X' orthogonal to the aforesaid first direction X and to the optical axis O.

Advantageously, the first membrane 2 of the lens 100 of the device 1 is made of any one transparent and deformable material, in particular flexible, such as for example a membrane made of glass or of plastic material.

In accordance with the preferred embodiment of the device 1, object of the present invention, the first membrane 2 is made of elastically pliable material, in particular it is made with a glass membrane.

Preferably, the first membrane 2 has form elongated along the first direction X, and in particular is has substantially rectangular form.

More generally, the first membrane 2 of the lens 100 can have any substantially sheet-like shape, such as polygonal (e.g. square), as long as it is provided with two opposite (first and second) ends 2', 2", between which it is extended along the first direction X. In particular, the form of the first membrane 2 is such to identify, along the first direction X, the two opposite (first and second) ends 2', 2" with respect to the other extension directions of the first membrane 2.

Advantageously, the first membrane 2 comprises a traversing area (not identified in the enclosed figures) intended to be traversed by at least one light beam and preferably substantially provided in a central zone with respect to the first and second ends 2', 2".

More in detail, the light beam traverses the lens 100 of the device 1, intercepting the first external face 2A at the aforesaid traversing area and exiting from the first internal face 2B.

The lens 100 also comprises at least one first optical layer 4, of deformable material and at least partially transparent, placed on the first internal face 2B of the first membrane 2.

Advantageously, the first optical layer 4 is made of any one transparent deformable material, such as for example a transparent liquid, a polymer, a rubber, an oil, a water-based liquid, paraffin, a gel or an elastomer.

Preferably, the first optical layer 4 is made of an elastically deformable solid material (natural or synthetic), in particular in rubbery state, such as for example at least one elastomer.

Advantageously, the first optical layer 4 is deformable and takes on different configurations based on the form that the first membrane 2 assumes, remaining substantially always adhered to the first internal face 2B of the first membrane 2.

The lens 100 of the device 1, object of the present invention, also comprises first actuator means 6 mechanically connected to the first membrane 2 and arranged for varying the curvature of the first membrane 2 with respect to the optical axis O.

More clearly, the first actuator means 6 are arranged for moving the first end 2' and the second end 2" of the first membrane 2 so as to vary the geometry of the first membrane 2 and consequently of the optical layer 4.

According to the idea underlying the present invention, the first actuator means 6 of the lens 100 of the device 1 comprise a first movement member 7, movable along a first movement direction having at least one component parallel to the optical axis O, mechanically connected to the first membrane 2 at the first end 2', and configured for thrusting or pulling the first membrane 2 at the first end 2'.

In addition, according to the idea underlying the present invention, the first actuator means 6 of the lens 100 of the device 1 comprise a second movement member 8, movable along a second movement direction having at least one component parallel to the optical axis O, mechanically connected to the first membrane 2 at the second end 2", and configured for thrusting or pulling the first membrane 2 at the second end 2" itself.

Suitably, the first and the second movement member 7, 8 are constrained, respectively, to the first and to the second end 2', 2" of the first membrane 2 in a manner such to move such ends 2', 2" in compressing and/or pulling along the respective movement directions, simultaneously allowing at least one suitable degree of freedom that prevents damaging or breaking the first membrane 2, as discussed in detail hereinbelow.

Advantageously, the first and the second movement member 7, 8 are constrained at the external face 2B of the first membrane 2. For the purpose of moving the first and the second movement member 7, 8, according to the idea underlying the present invention, the first actuator means 6 of the lens 100 of the device 1 also comprise at least one first drive member 9 operatively connected to the first movement member 7 and to the second movement member 8.

The first drive member 9 is arranged for moving the first movement member 7 and the second movement member 8 respectively along the first and the second movement direction by respectively moving the first end 2' and the second end 2" of the first membrane 2 at least parallel to the optical axis O, in order to place the first membrane 2 at least in a curved configuration.

In this manner, the adaptive optical device 1, object of the present invention, allows actively deforming the first membrane 2 in a quick, simple manner and in particular allowing being able to apply the lens 100 of the device 1 itself to a greater number of applications that require a large variation of the focal distance that is fully automatic and quick.

Suitably, in the event that the first optical layer 4 is made with a solid material (elastically deformable), the action of the movement members 7, 8 on the ends 2', 2" of the first membrane 4 determines a variation of the pressure exerted on the first optical layer 4 at such ends 2', 2", as well as in particular a variation of the volume of the first optical layer 4, which allows obtaining the variation of the curvature of the first membrane 4.

In particular, the adaptive optical device 1, object of the present invention, allows modifying the geometry of the first membrane 2 of the lens 100, deforming it up to several millimeters, due to the first actuator means 6.

More in detail, each of the first and second movement members 7, 8 is movable along a corresponding first and second movement direction substantially parallel to the optical axis which intercepts respectively the first end 2' and the second end 2" of the first membrane 2 of the lens 100 of the device 1.

Figure 3:
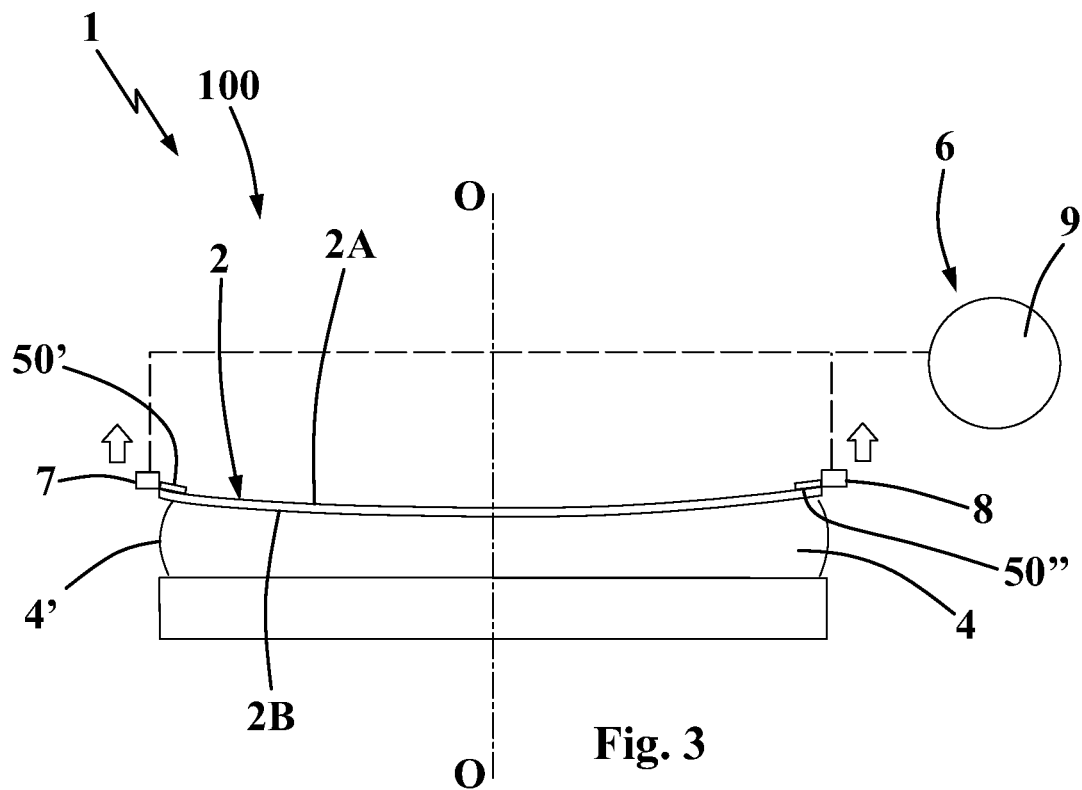
FIG. 3 shows a front axonometric schematic view of the adaptive optical device, object of the present invention, in the aforesaid first embodiment, with actuator means moved into a first configuration.
Figure 4:
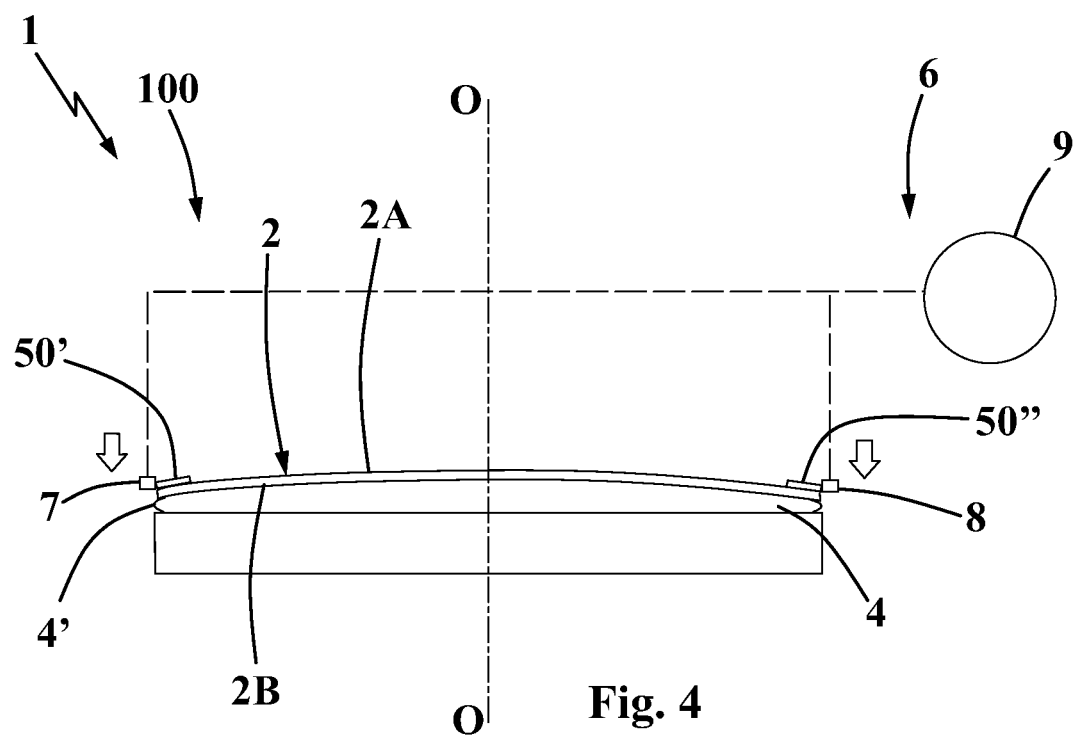
FIG. 4 shows a front axonometric schematic view of the adaptive optical device, object of the present invention, in the aforesaid first embodiment, with actuator means moved into a second configuration.

Such first and second movement direction parallel to the optical axis O are defined in proximity to the first and second ends 2', 2" of the membrane 2. Therefore, the first and the second movement members 7, 8 can be of any type susceptible of defining the aforesaid two movement directions substantially parallel to the optical axis O in proximity to the first membrane 2. Advantageously, the first membrane 2, in the aforesaid curved position, is extended from the first end 2' to the second end 2", with at least one curved section having at least one bending point, since such curved section can be concave towards the first external surface 2A (such as for example in the position of FIG. 3) or convex towards the first external surface 2A (such as for example in the position of FIG. 4), in particular as a function of the optical effect to be attained.

Suitably, the curved section of the first membrane 2 is delineated on the transverse section of the latter, defined on a plane orthogonal to the first transverse direction X'.

Preferably, the curved configuration defines a shape substantially with cylindrical sector. Advantageously, the first membrane 2 in the aforesaid at least one curved position has a transverse section, in particular with cylindrical sector, substantially constant with respect to a first transverse direction X', orthogonal to the first direction X and to the optical axis O.

Preferably, the transverse section of the first membrane 2 in the at least one curved position is shaped substantially as an arc of circumference, for the purpose of conferring to the lens 100 a geometry known in the technical jargon of the field with the name "cylindrical geometry". Suitably, according to the examples of FIGS. 1-18, the first and second movement members 7, 8 are extended substantially along the entire corresponding ends 2', 2" of the first membrane 2, so as to obtain, in particular in the curved position of the latter, the aforesaid "cylindrical geometry".

Figure 19:
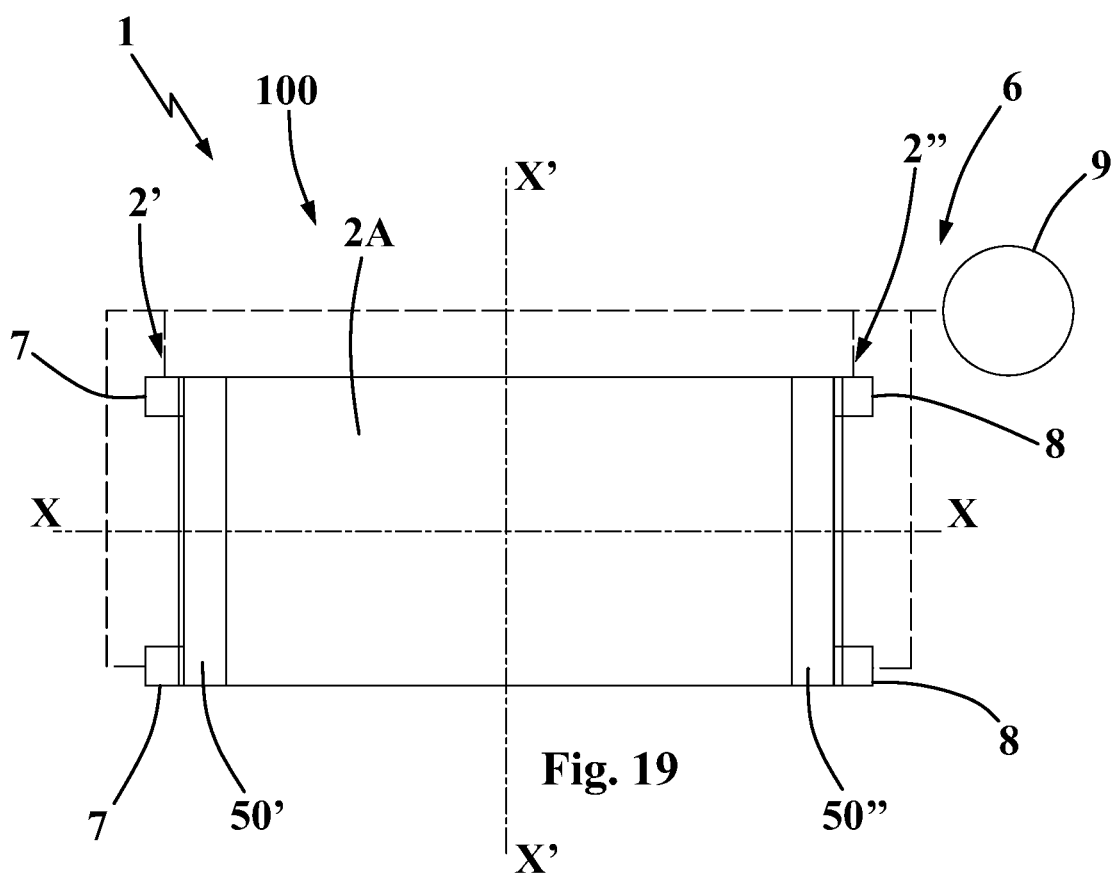
FIG. 19 shows a top plan schematic view of the adaptive optical device, object of the present invention, in a thirteenth embodiment thereof.

Otherwise, the curved configuration of the first membrane 2 advantageously has substantially saddle shape, obtainable for example by means of the embodiment schematized in FIG. 19, in which each movement member 7, 8 has two corresponding portions placed at respective ends of the respective end 2', 2", and actuatable in an independent manner from the first drive member 9.

Suitably, as briefly indicated above, the first and the second movement member 7, 8 are respectively constrained to the first and to the second end 2', 2" of the first membrane 2, allowing at least one suitably degree of freedom which prevents damaging or breaking the first membrane 2.

Figure 16:
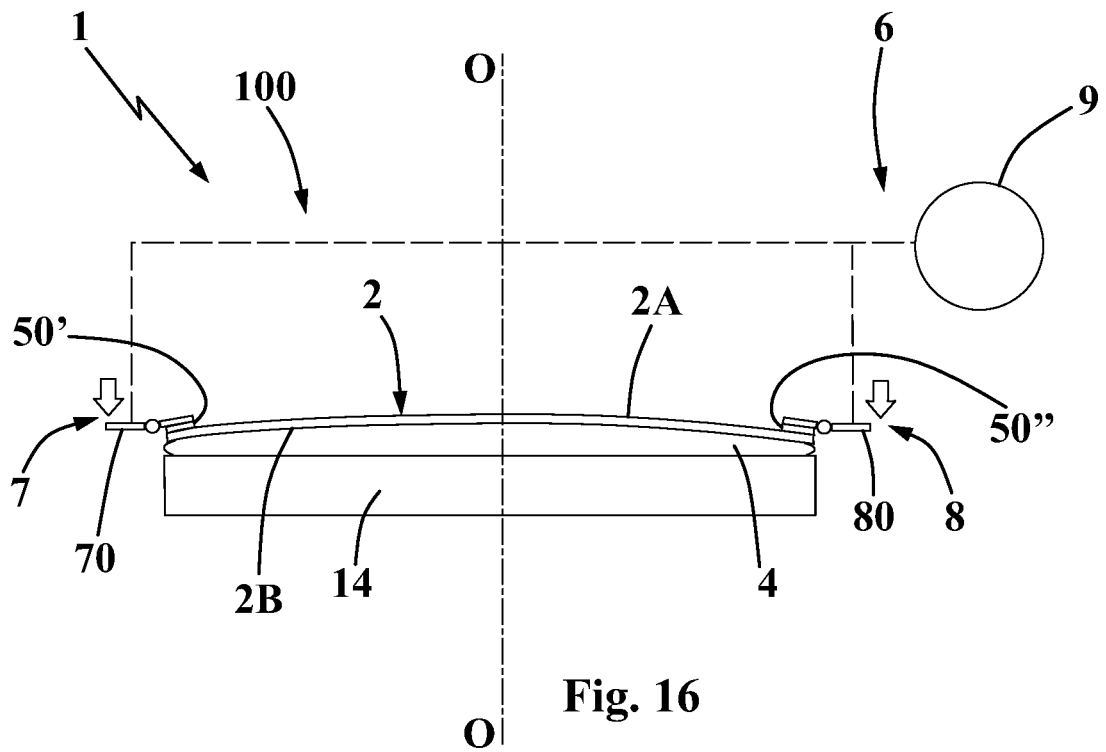
FIG. 16 shows a front axonometric schematic view of the adaptive optical device, object of the present invention, in a tenth embodiment thereof.
Figure 17:
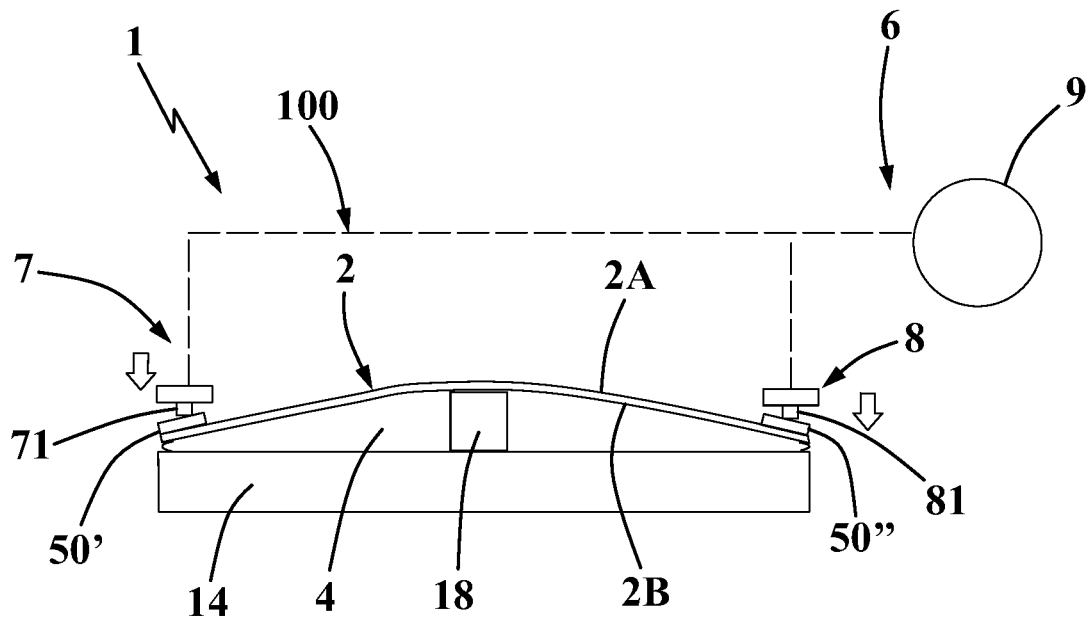
FIG. 17 shows a front axonometric schematic view of the adaptive optical device, object of the present invention, in an eleventh embodiment thereof.
Figure 18:
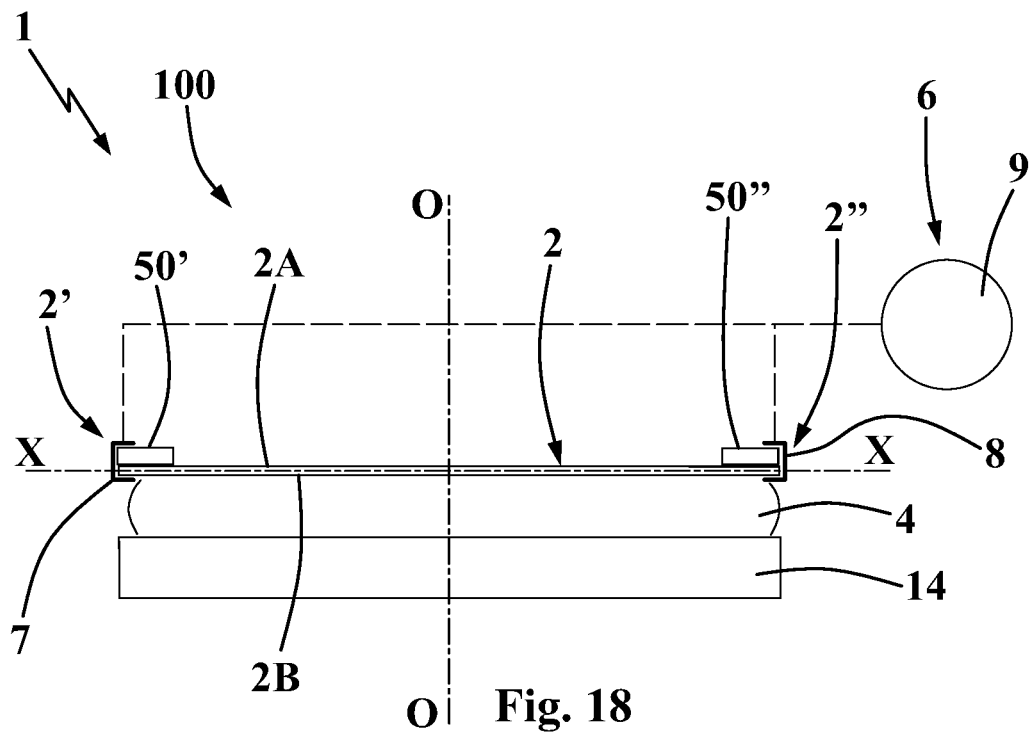
FIG. 18 shows a front axonometric schematic view of the adaptive optical device, object of the present invention, in a twelfth embodiment thereof.

Several merely exemplifying examples of connection between the movement member 7, 8 and the corresponding end 2', 2" of the membrane 2 are illustrated in FIGS. 16-18.

According to the example of FIG. 16, the first and the second movement member 7, 8 can comprise two corresponding hinges 70, 80, each having one wing fixed to the corresponding end 2', 2" of the first membrane 2 and the other wing movable by the first drive member 9 to translate along the respective movement direction.

Otherwise, in accordance with the example of FIG. 17, the first and the second movement members 7, 8 can comprise two corresponding flexible elements 71, 81 placed in contact with the respective ends 2', 2" of the first membrane 2 in order to constrain it during its movement. In accordance with a further example illustrated in FIG. 18, each movement member 7, 8 is provided with an engagement seat in which the corresponding end 2', 2" of the first membrane 2 is inserted, allowing a sliding of such end 2', 2" along the first direction X which prevents damage thereof during the movement of the movement members 7, 8.

In accordance with the embodiments of the device 1, object of the present invention, illustrated in the enclosed FIGS. 7-11, the lens 100 comprises a second transparent and deformable membrane 3, which intercepts the optical axis O, and it is provided with a second external face 3A and a second internal face 3B opposite the second external face 3A, and is extended, at least along a second direction Y, substantially orthogonal to said optical axis O, preferably but not exclusively tilted with respect to the first direction X, between a third end 3' and an opposite fourth end 3", being superimposed on the first membrane 2 in a specific superimposition zone 32 traversed by the optical axis O.

Advantageously, the ends 3', 3" of the second membrane 3 are extended along a first transverse direction Y' orthogonal to the aforesaid second direction Y and to the optical axis O.

Preferably, the second membrane 3 of the lens 100 of the device 1 is made of any one transparent flexible material, such as for example a glass membrane or a plastic membrane, and in particular the second membrane 3 is made with the same material constituting the first membrane 2.

Otherwise, the first membrane 2 of the lens 100 of the device 1 is made of a material different from the second membrane 3, for example the first membrane 2 can be made of plastic material and the second membrane 3 of glass, or vice versa.

In accordance with the preferred embodiment of the device 1, object of the present invention, the second membrane 3 is made of elastically pliable material, in particular it is made with a glass membrane.

Preferably, the second membrane 3 has elongated form along the second direction Y, and in particular has substantially rectangular form, preferably corresponding to the form of the first membrane 2.

In general (analogous to the first membrane 2), the second membrane 3 of the lens 100 of the device 1, object of the present invention, can have any substantially sheet-like form, such as for example polygonal (even square), as long as it is provided with two opposite (third and fourth) ends 3', 3", between which the second membrane 3 is extended along the second direction Y. Advantageously, the second membrane 3 comprises a traversing area (not identified in the enclosed figures) intended to be traversed by at least one light beam and preferably substantially provided in a central zone with respect to the third and to the fourth end 3', 3".

More in detail, the light beam traverses the lens 100 of the device 1, intercepting the second internal face 3B, after having intercepted the first membrane 2, at the aforesaid traversing area and exiting from the second external face 3A.

In accordance with the preferred embodiments illustrated in the enclosed figures, the aforesaid superimposition zone 32 between the first membrane 2 and the second membrane 3 comprises the traversing zone susceptible of being traversed by the light beam.

Advantageously in addition, the adaptive optical device 1 comprises second actuator means 10, which are mechanically connected to the second membrane 3 and are arranged for varying the curvature of the second membrane 3 with respect to the optical axis O.

More clearly, the second actuator means 10 are arranged for moving the third end 3' and the fourth end 3" of the second membrane 3 so as to vary the geometry of the second membrane 3.

More in detail, the second actuator means 10 comprise a third movement member 11, movable along a third movement direction having at least one component parallel to the optical axis O, mechanically connected to the second membrane 3 at the third end 3' and configured for thrusting or pulling the second membrane 3 itself at the third end 3'.

In addition, the second actuator means 10 advantageously comprise a fourth movement member 12, movable along a fourth movement direction having at least one component parallel to the optical axis O, mechanically connected to the second membrane 3 at the second end 3" and configured for thrusting or pulling the second membrane 3 at the second end 3".

In addition, the second actuator means 10 comprise at least one second drive member 13 operatively connected to the third movement member 11 and to the fourth movement member 12 and arranged for moving the third movement member 11 and the fourth movement member 12 respectively along the third and fourth movement direction by moving, respectively, the third end 3' and the fourth end 3" of the second membrane 3 parallel to the optical axis O, in order to place the second membrane 3 at least in a curved configuration.

In particular, the curved configuration of the second membrane 3 has the same characteristics described above for the first membrane 2.

More in detail, each of the third and fourth movement members 11, 12 is movable along a corresponding third and fourth movement direction substantially parallel to the optical axis O which intercepts respectively the third end 3' and the fourth end 3" of the second membrane 3 of the lens 100 of the device 1.

Such third and fourth movement direction parallel to the optical axis O are defined in proximity to the third and fourth ends 3', 3" of the second membrane 3. Therefore, the third and the fourth movement members 11, 12 can be of any type susceptible of defining the aforesaid two movement directions substantially parallel to the optical axis O in proximity to the second membrane 3.

Preferably, the third and the fourth movement members 11, 12 are mechanically connected to the second membrane 3 at the second external face 3A, in accordance with the embodiments of the device 1 illustrated in the enclosed FIGS. 7-11.

Advantageously, the second membrane 3 in the aforesaid at least one curved position has a transverse section that is substantially constant (in particular with cylindrical sector) with respect to a second transverse direction (not illustrated in the enclosed figures), orthogonal to the second direction Y and to the optical axis O.

Advantageously, the third and the fourth movement member 11, 12 have the same characteristics of those, respectively, of the first and second movement member 7, 8 discussed above, applied of course to the second membrane 3. Preferably, with reference in particular to the example of FIG. 19 introduced above, the first and second movement members 7, 8 each comprise a first and a second engagement portion mechanically associated at a corner of the first membrane 2, in particular if the membrane 2 has quadrangular form. Each of the first and second engagement portions is movable independent of the other second and first engagement portion, so as to deform the first membrane 2 into a complex configuration, e.g. saddle-shaped. The aforesaid configuration of FIG. 19 is also employable with the second membrane 3, in which the third and fourth movement member 11, 12 preferably each comprise a first and a second engagement portion mechanically associated at a corner of the second membrane 3, in particular if the second membrane 3 has quadrangular form, so as to deform the second membrane 3 into a complex configuration, e.g. saddle-shaped.

Advantageously, the deformable lens comprises at least one first stiffening strip 50' and a second stiffening strip 50" placed, respectively, along the first end 2' and the second end 2" of the first membrane 2, in particular on the first external face 2B of the first membrane 2 itself. Suitably, the first and the second movement member 7, 8 engage the first membrane 2 by respectively acting on the first and on the second stiffening strip 50', 50", in a manner such that, in particular, the action exerted by each movement member 7, 8 is distributed, by means of the corresponding stiffening lamina 50', 50", in a substantially uniform manner along the corresponding end 2', 2" of the first membrane 2.

In particular, such configuration of the stiffening strips 50', 50" prevents considerable undesired deformations along the corresponding end 2', 2" of the first membrane 2, ensuring a high optical quality of the deformable lens.

Advantageously, the stiffening strips 50', 50" allow maintaining substantially rectilinear and parallel the ends 2', 2" of the first membrane 2, ensuring a high precision of the curvature of the latter, in particular in case of curvature with cylindrical sector.

Advantageously, each of the stiffening strips 50', 50" comprises a corresponding more rigid strip of the first membrane 2 and fixed, in particular via gluing, on the first external face 2A (or on the first internal face 2B) of the first membrane 2.

Suitably, each stiffening strip 50', 50" comprises a glass lamina (e.g. with thickness of 0.5 mm) glued on the first external face 2A of the first membrane 2 along the corresponding end 2', 2" of the latter.

Advantageously, each stiffening strip 50', 50" has a specific degree of flexibility, in order to allow the deformation of the corresponding end 2', 2" in order to obtain a saddle-shaped curvature of the first membrane 2 (as in the example of FIG. 19).

Advantageously, the deformable lens comprises at least one third stiffening strip 51' and a fourth stiffening strip 51" placed, respectively, along the third end 3' and the fourth end 3" of the second membrane 3.

Suitably, the third and the fourth movement member 11, 12 engage the second membrane 3 by respectively acting on the third and on the fourth stiffening strip 51', 51", in a manner such that, in particular, the action exerted by each movement member 11, 12 is distributed, by means of the corresponding stiffening lamina 51', 51", in a substantially uniform manner along the corresponding end 3', 3" of the second membrane 3, in a manner substantially analogous to that discussed above for the first and the second stiffening lamina 50', 50" of the first membrane 2. Advantageously, the third and the fourth stiffening strips 51', 51" have the same characteristics as the first and second stiffening lamina 50', 50" of the first membrane 2, in accordance with that described above.

Preferably, the transverse section of the second membrane 3 in the at least one curved position has substantially arc of circumference shape, and in particular it preferably substantially corresponds to the transverse section of the first membrane 2, for the purpose of conferring to the lens 100, together with the first membrane 2, a geometry known in the technical jargon of the field with the name "spherical geometry".

Advantageously, the section is defined by the intersection of the second membrane 3 with a section plane, which comprises the second direction Y of the second membrane 3 and the optical axis O of the lens 100.

More clearly, the superimposition of the two membranes 2, 3, both in the curved position, to each define a cylindrical geometry, i.e. with transverse section substantially shaped as an arc of circumference, forms an overall geometry of the lens 100 of the device 1 suitable to form a wavefront for the light that intercepts the traversing zone entirely similar to that of a lens with spherical geometry.

In this manner, the device 1, object of the present invention, allows obtaining a wavefront of the light of a lens substantially with spherical geometry by means of the superimposition of two membranes both shaped with cylindrical geometry, i.e. both provided with the aforesaid transverse section with arc of circumference shape.

Advantageously, in order to define the aforesaid superimposition zone 32 and therefore obtain the wavefront of a spherical geometry, the second direction Y of the second membrane 3 is substantially orthogonal to the first direction X of the first membrane 2.

Of course, in order to obtain any desired wavefront for the light beam which traverses the superimposition zone 32 of the first membrane 2 and of the second membrane 3, the first direction X can define any one desired angle with the second direction Y.

For such purpose, in accordance with an embodiment of the device 1 not illustrated in the enclosed figures, the second membrane 3 is advantageously rotatably associated with the first membrane 2 in order to rotate, with relative motion with respect to the first membrane 2, around a rotation axis parallel to the optical axis O.

Preferably, the rotation axis of the second membrane 3 coincided with the optical axis O of the lens 100 of the adaptive optical device 1.

In this manner, with the rotation of at least one of the membranes 2, 3 around the rotation axis, the wavefront of the light which traverses the first and second membranes 2, 3 varies its angle. Suitably, both the membranes 2, 3 are rotatable around the aforesaid rotation axis, so as to obtain a configuration which allows obtaining, in a particularly flexible manner, the desired angle.

Advantageously, the first membrane 2, and preferably the second membrane 3, are mounted on a rotary structure (not illustrated), which is movable in rotation around the rotation axis (parallel to the optical axis O and preferably coinciding with the optical axis O).

Figure 11:
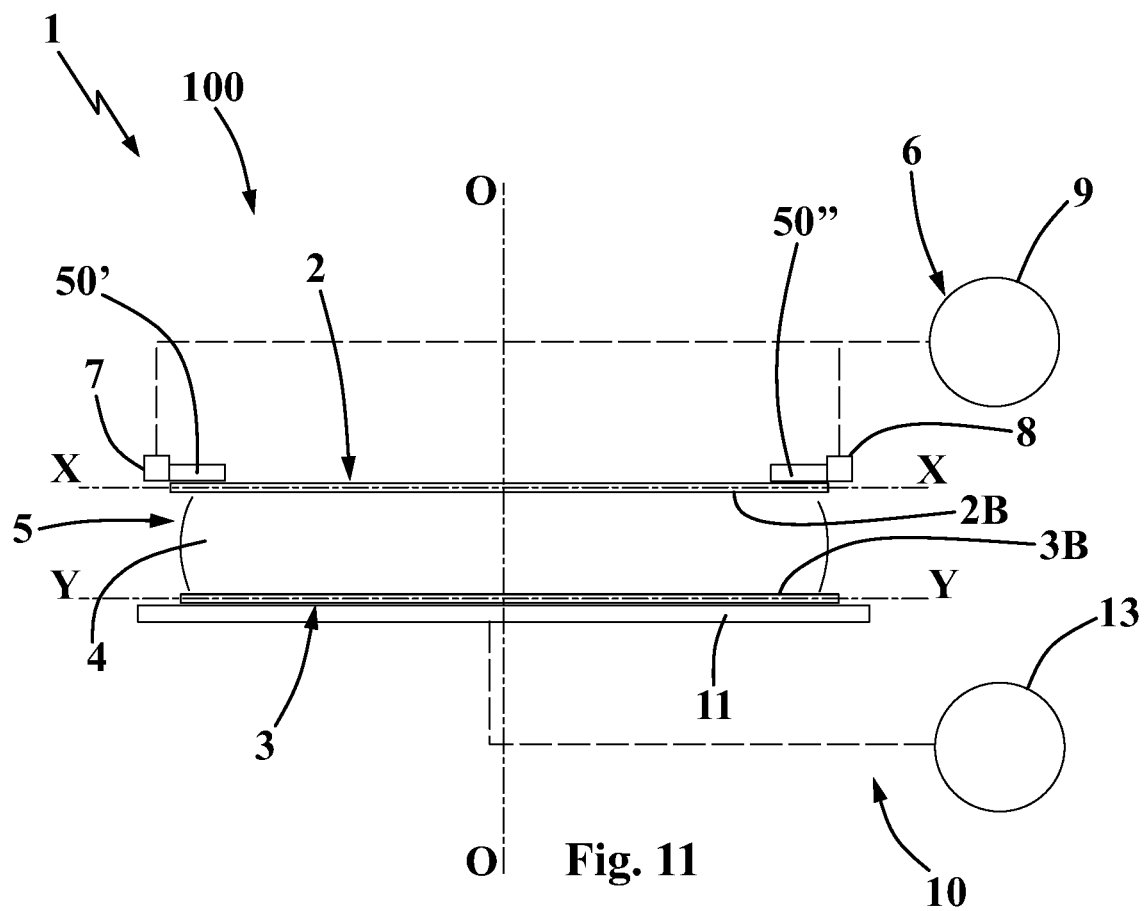
FIG. 11 shows a front axonometric schematic view of the adaptive optical device, object of the present invention, in a fifth embodiment thereof.

With particular reference to the embodiment illustrated in the enclosed FIG. 11, in which advantageously the second direction Y of the second membrane 3 is orthogonal to the first direction X of the first membrane 2, the first internal face 2B of the first membrane 2 and the second internal face 3B of the second membrane 3 define an optical chamber 5 between them, in which the first optical layer 4 is placed.

Otherwise, in accordance with the embodiments illustrated in the other enclosed figures, the adaptive optical device 100, object of the present invention, comprises a first support base 14 that is rigid and at least partially transparent, which intercepts the optical axis O with a first side and an opposite second side. On such first side, the first optical layer 4 is placed which is interposed between the support base 14 and the first membrane 2.

Advantageously, the first support base 14 is made of more rigid material than the first membrane 2, such as for example glass or of plastic material, preferably transparent.

In accordance with the particular embodiments illustrated in the enclosed FIGS. 7-10, the first support base 14 is interposed between the second internal face 3B of the second membrane 3 and the first optical layer 4.

Advantageously, the device 1 also comprises a second optical layer 15 of deformable material and at least partially transparent, interposed between the second internal face 3B of the second membrane 3 and the second side of the first support base 14. Suitably, the second optical layer 15 is made of an elastically deformable solid material (natural or synthetic), in particular in the rubbery state, such as for example at least one elastomer.

Preferably, in accordance with the latter embodiment, the first actuator means 6 and the second actuator means 10 respectively move the ends 2', 2", 3', 3" of the first membrane 2 and of the second membrane 3 away from or close to the first support base 14.

Figure 5:
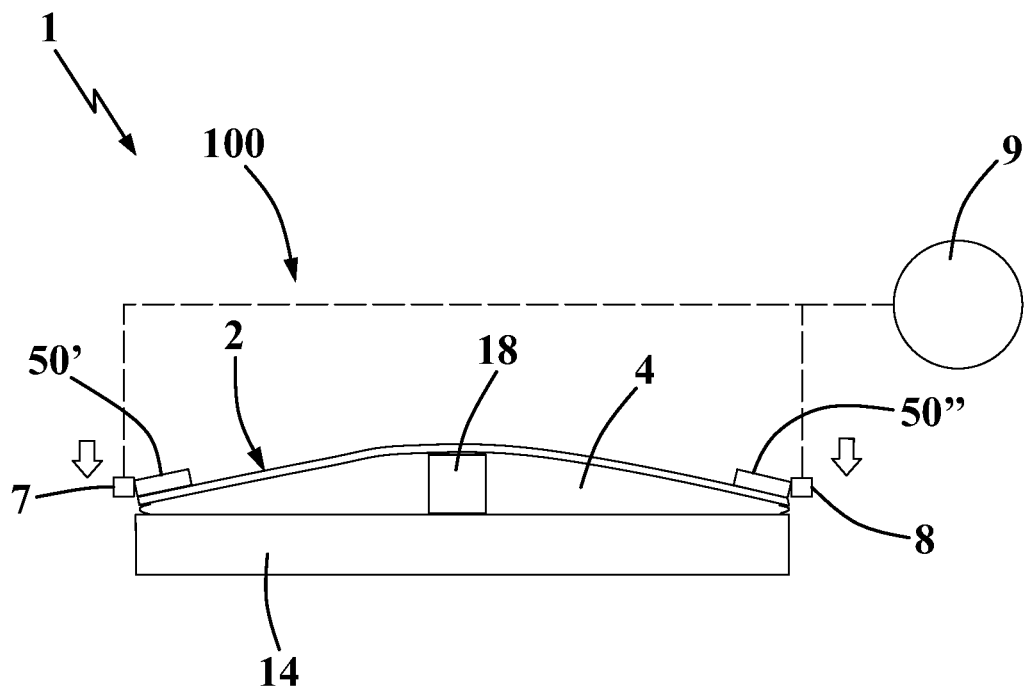
FIG. 5 shows a front axonometric schematic view of the adaptive optical device, object of the present invention, in a second embodiment thereof, with actuator means moved into a second configuration.
Figure 6:
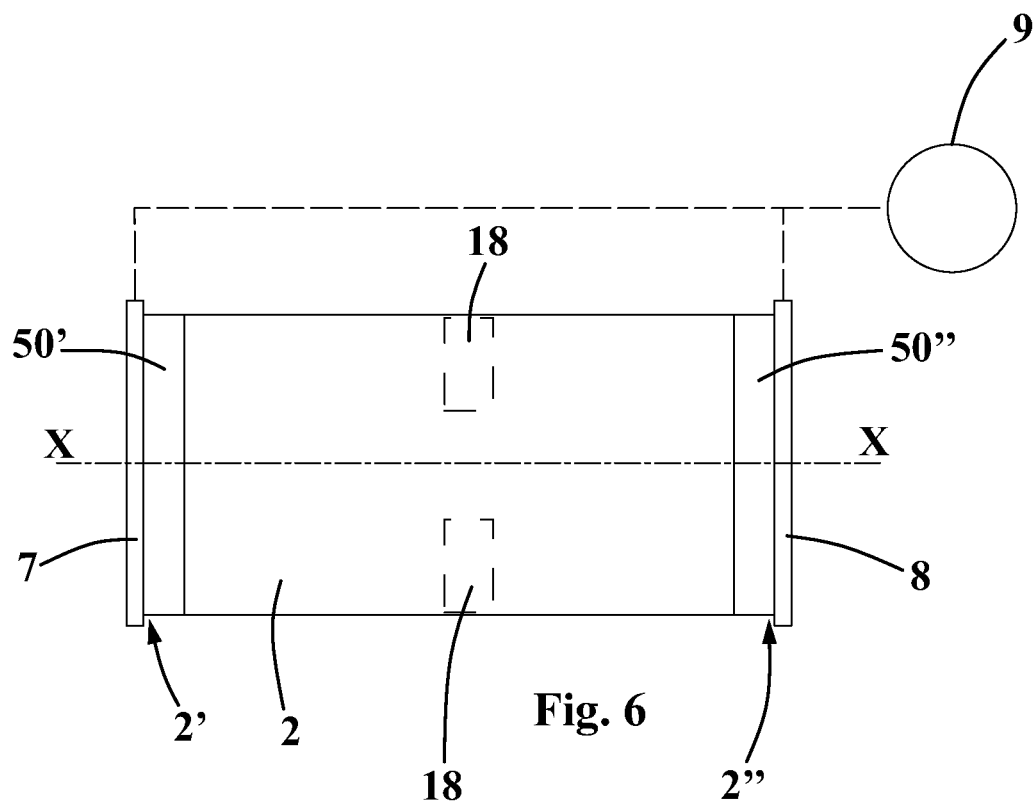
FIG. 6 shows a top plan schematic view of the present adaptive optical device, in the aforesaid second embodiment.
Figure 7:
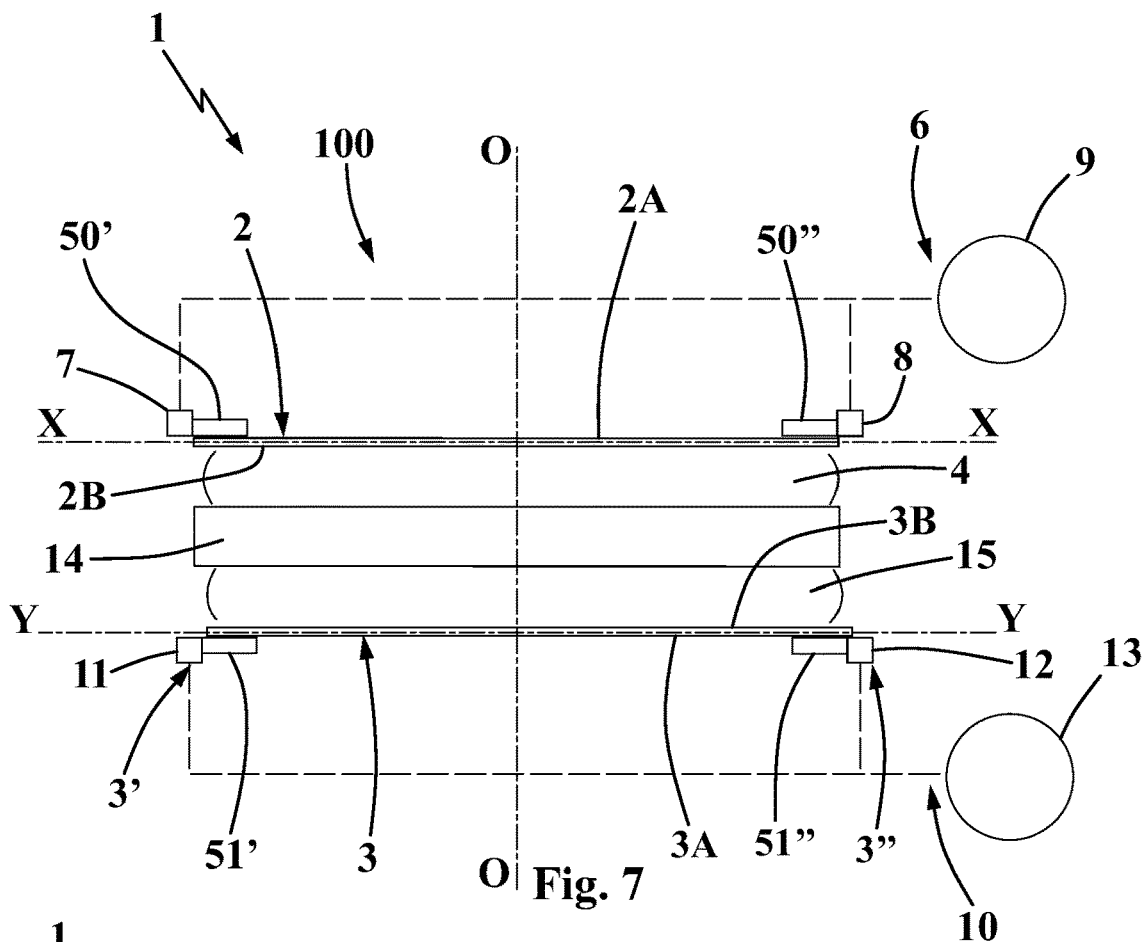
FIG. 7 shows a front axonometric schematic view of the adaptive optical device, object of the present invention, in a third embodiment thereof.
Figure 8:
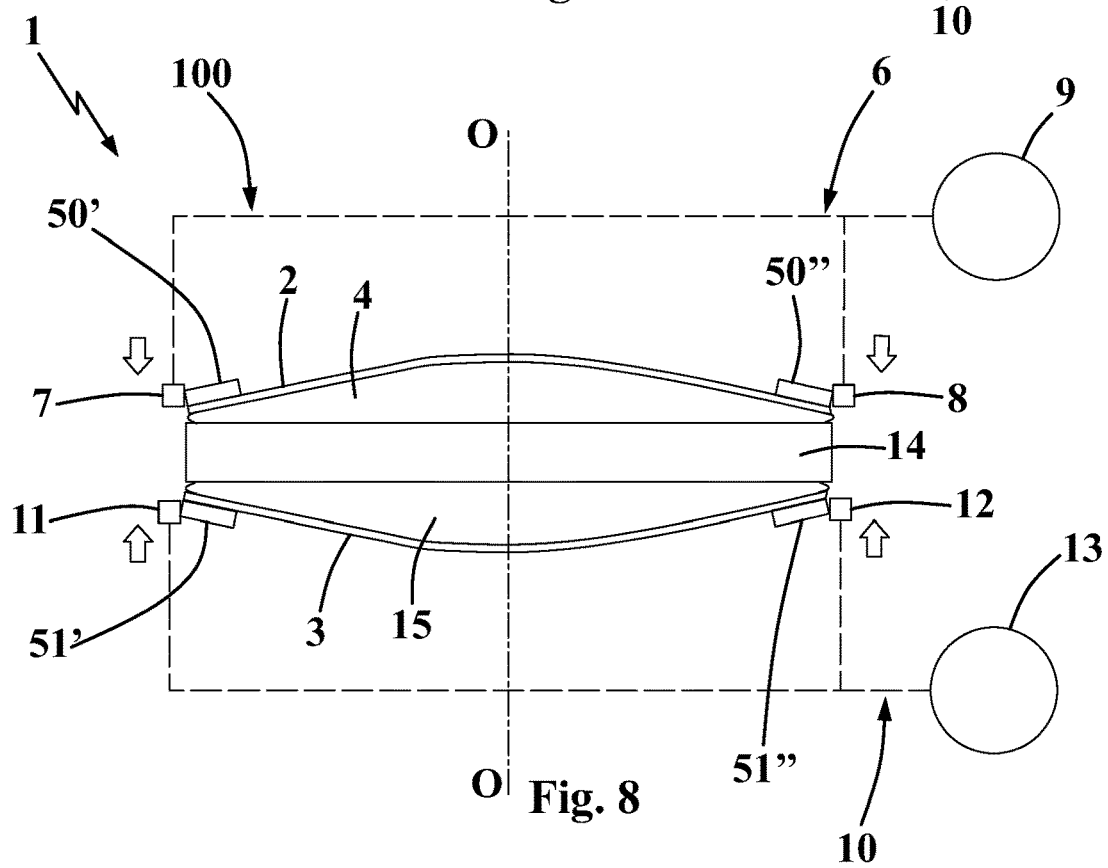
FIG. 8 shows a front axonometric schematic view of the adaptive optical device, object of the present invention, in the aforesaid third embodiment, with actuator means moved into a second configuration.

With particular reference to the embodiment of the adaptive optical device illustrated in the enclosed FIGS. 5, 6, in order to maintain a substantially constant thickness of the first optical layer 4 at the traversing zone of the first membrane 2, the device 1 comprises at least one spacer element 18 interposed between the first support base 14 and the first internal face 2B of the first membrane 2, made of substantially rigid material.

Preferably, the spacer element 18 is placed in proximity to the traversing zone of the first membrane 2, in particular in a position substantially equidistant between the first end 2' and the second end 2".

In this manner, during the movement of the first and of the second movement member 7, 8 of the first actuator means 6, the thickness of the first optical layer 4 is substantially constant, ensuring the attainment of the desired wavefront.

Figure 12:
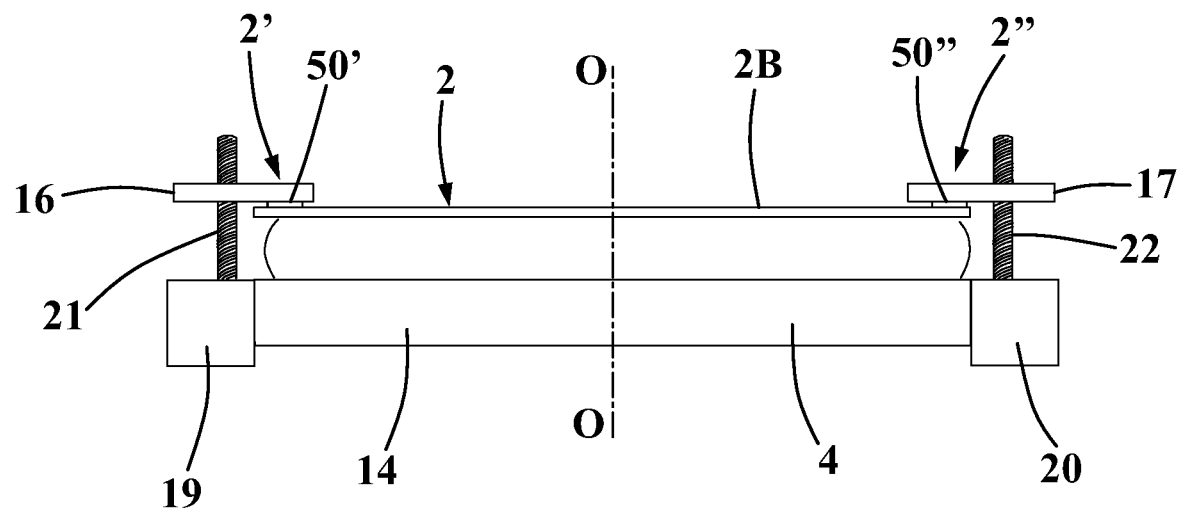
FIG. 12 shows a front axonometric schematic view of the adaptive optical device, object of the present invention, in a sixth embodiment thereof.

In accordance with the particular embodiment illustrated in the enclosed FIG. 12, the first movement member 7 and the second movement member 8 of the first actuator means 6 respectively comprise a first and a second carriage 16, 17 respectively mechanically constrained to the first and to the second end 2', 2" of the first external face 2A of the first membrane 2. Advantageously in addition, the first drive member 9 comprises at least one electric motor 19, 20 operatively connected to the first carriage 16 and to the second carriage 17 in order to move them at least parallel to the optical axis O.

More in detail, the first drive member 9 comprises a first electric motor 19 mechanically connected to the first carriage 16 by means of a first worm screw 21 and a second electric motor 20 mechanically connected to the second carriage 17 by means of a second worm screw 22.

In order to move the first and the second end 2', 2" of the first membrane 2 at least parallel to the optical axis O of the lens 100, the first and the second worm screws 21, 22 of the first actuator means 6 are extended starting from the respective first electric motor 19 and second electric motor 20 placed laterally with respect to the first support base 14, with which they are mechanically engaged and placed for being driven in rotation with the rotation of the motor itself.

Advantageously, the adaptive optical device 1 comprises a support structure (not illustrated in the enclosed figures) that is substantially rigid and configured for allowing the fixing of the movement members 7, 8 and of the drive members 9.

More in detail, the support structure comprises at least the aforesaid support base 14 and acts advantageously as a mechanical abutment for the first movement member 7 and for the second movement member 8 during their movement in order to move the first membrane 2.

Preferably the worm screws 21, 22 are extended laterally with respect to the first optical layer 4 parallel to the optical axis O and engage respectively the first carriage 16 and the second carriage 17 via screwing.

In this manner, with the rotation of the first and of the second electric motor 19, 20, the first and the second worm screws 21, 22 move the first and second carriage 16, 17 parallel to the optical axis O by engaging them via screwing through a respective threaded through hole.

Figure 13:
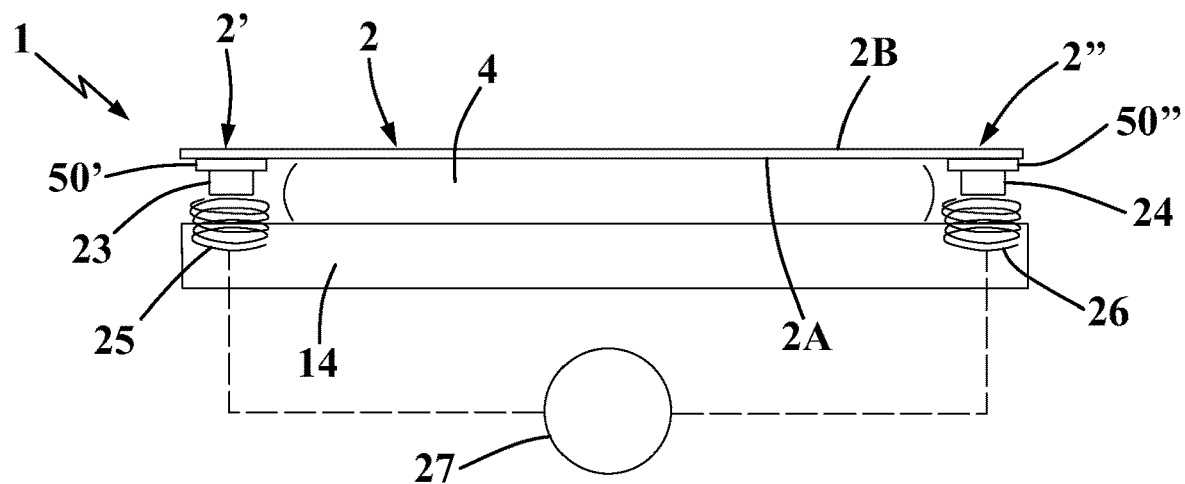
FIG. 13 shows a front axonometric schematic view of the adaptive optical device, object of the present invention, in a seventh embodiment thereof.

Otherwise, in accordance with the particular embodiment illustrated in the enclosed FIG. 13, the first movement member 7 comprises a first ferromagnetic element 23 mechanically constrained to the first internal face 2B of the first membrane 2 at the first end 2' and the second movement member 8 comprises a second ferromagnetic element 24 mechanically constrained to the first internal face 2B of the first membrane 2 at the second end 2".

In addition, the first drive member 9 comprises at least one first electromagnet 25 mechanically constrained to the first support base 14, aligned with the first ferromagnetic element 23 along a direction parallel to the optical axis O of the lens 100, and a second electromagnet 26, also mechanically constrained to the first support base 14, aligned with the second ferromagnetic element 24 along a direction parallel to the optical axis O of the lens 100.

The first drive member 9 also comprises advantageously at least one electrical power supplier 27 electrically connected to the first and to the second electromagnet 25, 26 in order to electrically power supply them.

More in detail, the electrical power supplier 27 is configured for power supplying the first and the second electromagnet 25, 26 with a first and a second variable power supply voltage so as to generate a corresponding first and second magnetic field for attracting or repulsing respectively the first and the second ferromagnetic elements 23, 24.

In this manner, by commanding the variable electrical power supplier 27, it is possible to move the first and the second ferromagnetic elements 23, 24 along two corresponding movement directions parallel to the optical axis O of the lens 100, for simultaneously moving also the first and the second end 2', 2" of the first membrane 2.

Figure 14:
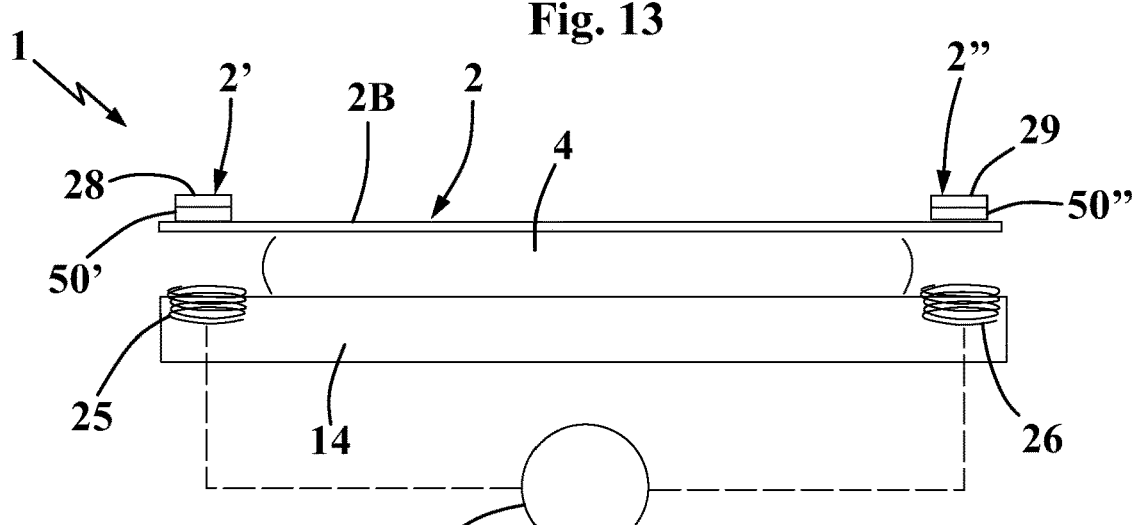
FIG. 14 shows a front axonometric schematic view of the adaptive optical device, object of the present invention, in an eighth embodiment thereof.

Otherwise, in accordance with the particular embodiment illustrated in the enclosed FIG. 14, in place of the aforesaid first and second ferromagnetic elements 23, 24, the first movement member 7 comprises a first permanent magnet 28 mechanically constrained to the first external face 2A of the first membrane 2 at the first end 2' and the second movement member 8 comprises a second permanent magnet 29 mechanically constrained to the first external face 2A of the first membrane 2 at the second end 2".

In this manner, by commanding the variable electrical power supplier 27, it is possible to move the first and the second permanent magnets 28, 29 along two corresponding movement directions parallel to the optical axis O of the lens 100, for simultaneously moving also the first and the second end 2', 2" of the first membrane 2.

Figure 15:
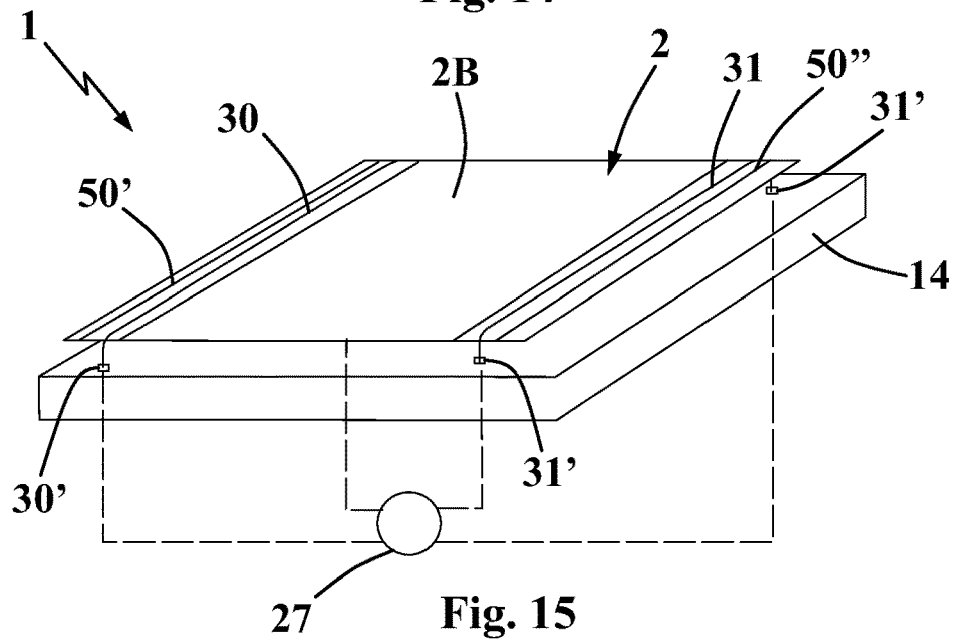
FIG. 15 shows a front axonometric schematic view of the adaptive optical device, object of the present invention, in a ninth embodiment thereof.

In accordance with the particular embodiment illustrated in the enclosed FIG. 15, the first movement member 7 comprises a first filament with shape memory 30 mechanically associated with the first external face 2A of the first membrane 2 at the first end 2' and the second movement member 8 comprises a second filament with shape memory 31 mechanically constrained to the first external face 2A of the first membrane 2 at the second end 2".

Advantageously, the first and the second filaments with shape memory 30, 31 are made of metallic material and in particular they are made with a metal alloy with shape memory.

As is known, the metal alloys with shape memory are provided with the capacity, after a deformation from a first configuration to a second configuration, of recovering the shape of the first configuration following a change of their internal temperature, in particular following a heating.

More in detail, the first and the second filament with shape memory 30, 31 of the first actuator means 6 of the device 1 are configured for decreasing the length thereof following a heating thereof, in particular a heating via ohmic effect.

More in detail, the first and the second filament with shape memory 30, 31 are extended between two opposite ends 30', 31' constrained to the first support base 14 and are provided with a substantially central section placed astride the first membrane 2, fixed on the first external face 2A of the first membrane 2 itself.

The first drive member 9 also comprises advantageously the aforesaid at least one variable electrical power supplier 27 electrically connected to the ends 30', 31' of the first and of the second filament with shape memory 30, 31.

In this situation, the variable electrical power supplier 27 electrically power supplies the first and the second filament with shape memory 30, 31 with a respective first and second electric current suitable for decreasing the length of the first and second filaments 30, 31 themselves.

In operation, with the variation of the length of the first and second filaments with shape memory 30, 31, the first and the second end 2', 2" of the first membrane 2 is driven close to or away from the first support base 14, in order to modify the geometry of the lens 100 of the adaptive optical device 1, object of the present invention.

Figure 20:
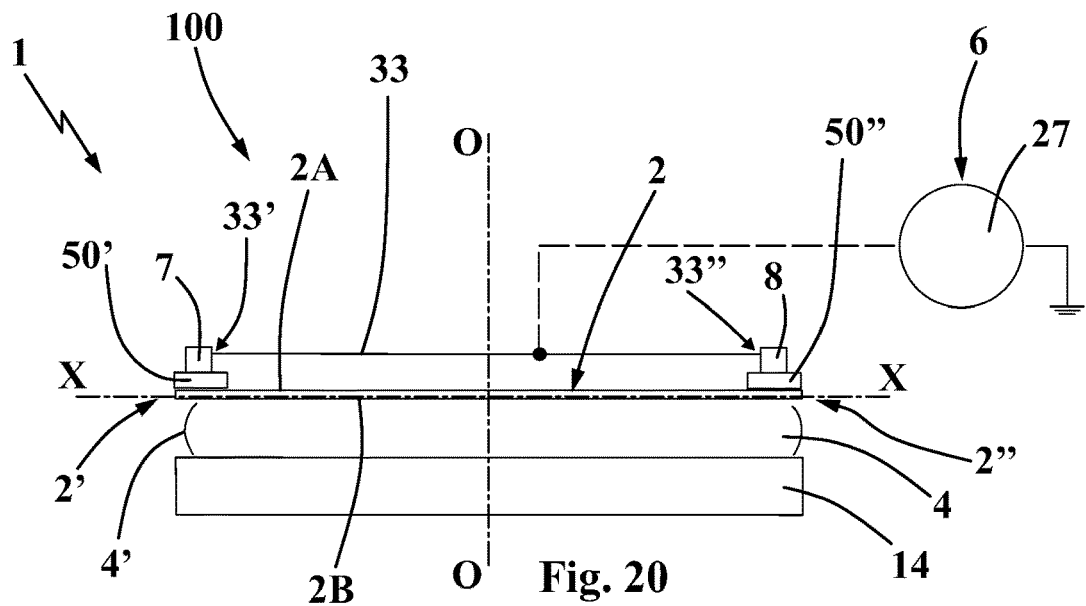
FIGS. 20 and 21 show, respectively, a front axonometric schematic view and a top plan schematic view of the adaptive optical device, object of the present invention, in a fourteenth embodiment thereof.
Figure 21:
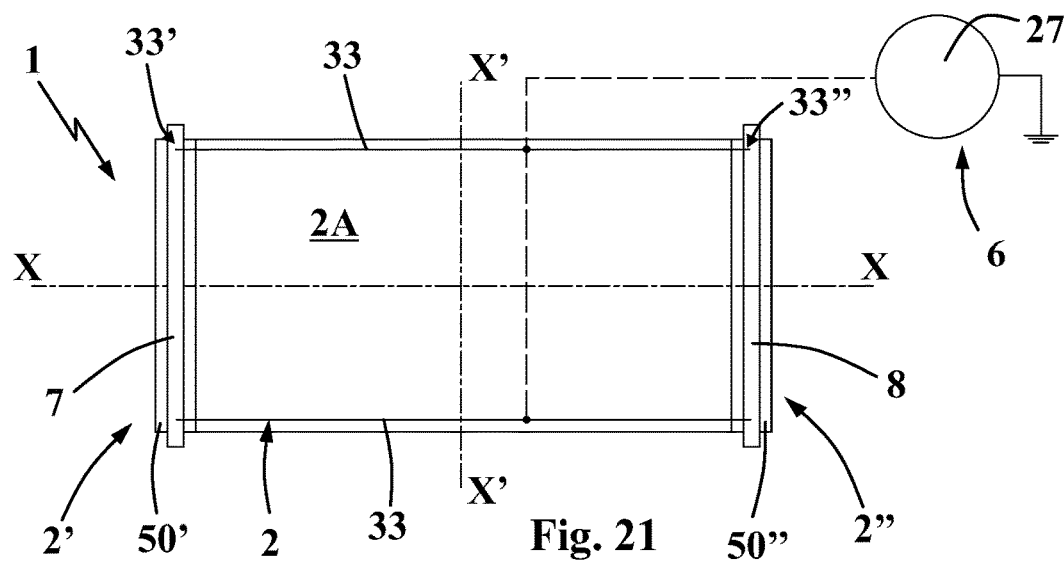
Figure 22:
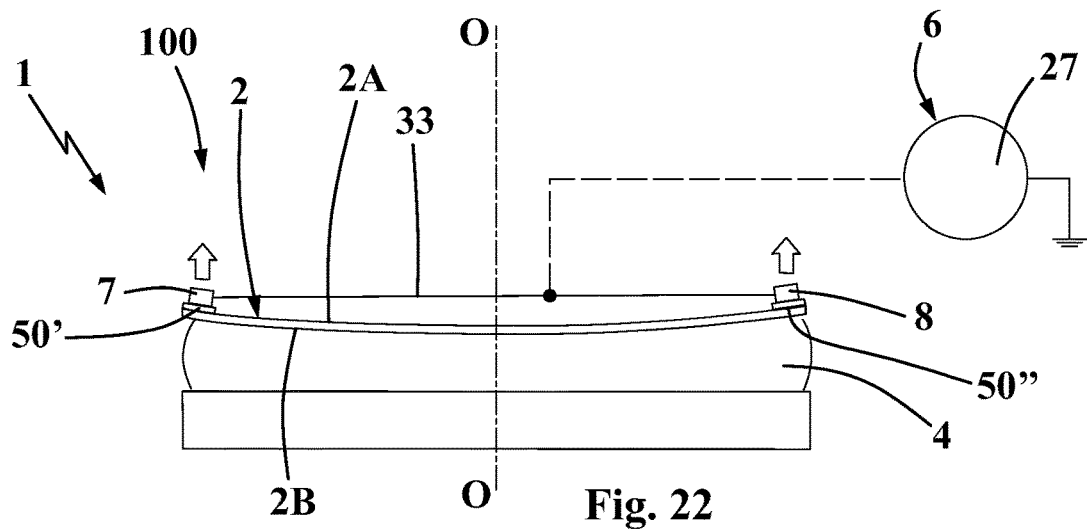
FIG. 22 shows the adaptive optical device of FIG. 20 with actuator means moved in order to set a specific curvature of the membrane.

In accordance with a further embodiment illustrated in FIGS. 20-22, the first and the second movement member 7, 8 are connected to each other by at least one thread with shape memory 33, e.g. threads with shape memory 33 placed at opposite sides of the first membrane 2 with respect to the first direction X.

In particular, the thread with shape memory 33 is extended, along the aforesaid first direction X (and preferably parallel to the latter), between a first end 33', fixed to the first movement member 7, and a second end 33" fixed to the second movement member 8. Advantageously, the thread with shape memory 33 is made of metallic material and in particular with a metal alloy with shape memory.

Preferably, the first drive member 9 is placed in front of the first external face 2A of the first membrane 2, in particular spaced from the latter.

Advantageously, the first drive member 9 comprises a variable electrical power supplier 27 electrically connected to the thread with shape memory 33.

The variable electrical power supplier 27 is adapted to apply to the thread with shape memory 33 an electric current (settable and adjustable) that is suitable for adjusting the length of the latter.

In operation, the thread with shape memory 33, by being shortened or lengthened, respectively moves the two movement members 7, 8 close together or apart and, since the latter are constrained to the respective ends 2', 2" of the first membrane 2, also determines a movement component of the movement members 7, 8 along their respective movement directions. This determines a corresponding movement of the ends 2', 2" of the first membrane 2 at least along the movement directions and hence a variation of the curvature of the first membrane 2 itself, in accordance with that described above.

Of course, the particular embodiments of the first actuator means 6 described above and illustrated in the enclosed FIGS. 12-15 and 20-22 can be applied, mutatis mutandis, also to the second actuator means 10 associated with the second membrane 3, if provided.

Advantageously, the device 1, object of the present invention, comprises, in a further embodiment thereof, not illustrated in the enclosed figures, also a third membrane superimposed on the first membrane 2 and on the second membrane 3, which is extended between a fifth end and a sixth end.

The device also comprises third actuator means, provided with a fifth actuator member mechanically connected to the fifth end of the third membrane and a sixth actuator member mechanically connected to the sixth end, for moving respectively along a fifth and sixth movement direction the fifth end and the sixth end of the third membrane at least parallel to the optical axis O, in order to place the third membrane at least in a curved configuration with a curvature provided with at least one convexity.

Advantageously, the third membrane is rotatable with respect to the first membrane 2 and to the second membrane 3, around a rotation axis substantially coinciding with the optical axis O. Preferably, the third membrane is extended along a third direction tilted by about 45° with respect to the first direction X of the first membrane 2.

Advantageously, the first optical layer 4 is provided with a perimeter wall 4' extended around the optical axis O and extended through the thickness of the optical layer 4 along the optical axis O itself.

In particular, such perimeter wall is extended between the first internal face 2B of the first membrane 2 and the first support base 14 or the second internal face 3B of the second membrane 3 (depending on the considered embodiments).

Suitably, the attainment of the first optical layer 4 of solid material (elastically deformable) allows preventing the need to close the deformable lens around the perimeter wall 4' of the first optical layer 4. Indeed, the solid material (elastically deformable) is able to be self-supported and hence it is not necessary to make a volume that is closed in order to contain the first optical layer 4.

Advantageously, in the embodiments of the present invention which comprise the aforesaid second optical layer 15, the latter preferably has characteristics relative to the elastically deformable solid material described above for the first optical layer 4.

The invention thus conceived therefore attains the pre-established objects.

In particular, the adaptive optical device 1, object of the present invention, allows modifying the geometry of the first membrane 2 of the lens 100, deforming it up to several millimeters, due to the first actuator means 6.

In addition, the device 1, object of the present invention, allows obtaining a wavefront of the light of a lens substantially with spherical geometry by means of the superimposition of two membranes both shaped with cylindrical geometry, i.e. both provided with the aforesaid transverse section with arc or circumference shape.

The invention claimed is:

1. An adaptative optical device comprising at least one deformable lens provided with an optical axis, said at least one deformable lens comprising:
    a first membrane, transparent and deformable, which has a polygonal sheet-like shape, intercepts said optical axis, is extended, at least along a first direction substantially orthogonal to said optical axis, between a first end having a first end face and an opposite second end having a second end face, and is provided with a first external face and with a first internal face opposite said first external face; wherein the first end and the second end of said first membrane extend along a first transverse direction orthogonal to said first direction and to the optical axis; wherein the first end face of the first end and the second end face of the second end of said first membrane are movable at least parallel to said optical axis; wherein said first membrane comprises a traversing area intended to be traversed by at least one light beam and provided in a central zone with respect to said first end and second end;
    a first optical layer, of deformable material and at least partially transparent, placed on the first internal face of said first membrane; wherein said first optical layer is made of an elastically deformable solid material;
    a first support base that is rigid and at least partially transparent, which intercepts said optical axis with a first side and an opposite second side; wherein on said first side said first optical layer is placed that is interposed between said first support base and said first membrane;
    at least one spacer element which is made of substantially rigid material and is interposed between said first support base and the first internal face of said first membrane;
    a first actuator system mechanically connected to said first membrane and arranged for varying the curvature of said first membrane with respect to said optical axis;
    wherein said first actuator system comprises:
        a first movement member, movable along a first movement direction having at least one component parallel to said optical axis, mechanically connected to the first end of said first membrane, and configured for thrusting or pulling the first end face of the first end of said first membrane;
        a second movement member, movable along a second movement direction having at least one component parallel to said optical axis, mechanically connected to the second end of said first membrane, and configured for thrusting or pulling the second end face of the second end of said first membrane;
        a first drive member operatively connected to said first movement member and to said second movement member, and arranged for moving said first movement member and said second movement member respectively along said first and second movement direction, by respectively moving the first end and the second end of said first membrane at least parallel to said optical axis, in order to place said first membrane at least in a curved configuration;
    wherein said deformable lens comprises at least one first stiffening strip and at least one second stiffening strip placed, respectively, along the first end and the second end of said first membrane;
    wherein said first movement member and said second movement member engage said first membrane by respectively acting on said at least one first stiffening strip and on said at least one second stiffening strip;
    wherein said first membrane in said at least one curved position has a transverse section substantially constant along said first transverse direction;
    wherein said at least one spacer element is placed in proximity to the traversing area of said first membrane, in a position substantially equidistant between said first end and said second end;
    wherein said at least one spacer element comprises two spacer elements, which are placed on opposite flanks of said first membrane; wherein said opposite flanks are arranged orthogonally to said first transverse direction; and wherein said two spacer elements are spaced from each other along said first transverse direction, so that said two spacer elements let at least a portion of said traversing area free.

2. The adaptative optical device of claim 1, further comprising a transparent and deformable second membrane, which intercepts said optical axis, is provided with a second external face and a second internal face opposite said second external face, and is extended, at least along a second direction, substantially orthogonal to said optical axis between a third end and an opposite fourth end, said second membrane being superimposed on said first membrane in a specific superimposition zone traversed by said optical axis;
    wherein said adaptive optical device comprises a second actuator system, which is mechanically connected to said second membrane, is arranged for varying the curvature of said second membrane with respect to said optical axis, and comprises:
        a third movement member, movable along a third movement direction having at least one component parallel to said optical axis, mechanically connected to said second membrane at the third end and configured for thrusting or pulling said second membrane at the third end;
        a fourth movement member, movable along a fourth movement direction having at least one component parallel to said optical axis, mechanically connected to said second membrane at the second end and configured for thrusting or pulling said second membrane at the second end;
        a second drive member operatively connected to said third movement member and to said fourth movement member and arranged for moving said third movement member and said fourth movement memment directions by moving, respectively, the third end and the fourth end of said second membrane parallel to said optical axis, in order to place said second membrane at least in a curved configuration.

3. The adaptative optical device of claim 2, wherein the second direction of said second membrane is substantially orthogonal to the first direction of said first membrane.

4. The adaptative optical device of claim 2, wherein said second membrane is rotatably associated with said first membrane in order to rotate, with relative motion with respect to said first membrane, around a rotation axis parallel to said optical axis.

5. The adaptative optical device of claim 2, wherein the first internal face of said first membrane and the second internal face of said second membrane define an optical chamber between them in which said first optical layer is placed.

6. The adaptative optical device of claim 2, further comprising a first support base that is rigid and at least partially transparent, which intercepts said optical axis with a first side and an opposite second side, and on said first side said first optical layer being placed that is interposed between said first support base and said first membrane;
wherein said first support base is interposed between the second internal face of said second membrane and said first optical layer; said adaptative optical device further comprising a second optical layer of deformable material and at least partially transparent, interposed between the second internal face of said second membrane and the second side of said first support base.

7. The adaptative optical device of claim 1, wherein the first movement member and the second movement member of said first actuator means respectively comprise a first and a second carriage respectively mechanically constrained to the first and to the second end of the first external face of said first membrane; said first drive member comprising at least one electric motor operatively connected to said first carriage and to said second carriage in order to move them at least parallel to said optical axis.

8. The adaptative optical device of claim 1, wherein said elastically deformable solid material is in a rubbery state.

9. The adaptative optical device of claim 1, wherein said first movement member comprises a first ferromagnetic element mechanically constrained to said first membrane at said first end, and said second movement member comprises a second ferromagnetic element mechanically constrained to said first membrane at said second end;
wherein said first drive member comprises a first electromagnet, which is mechanically constrained to said first support base and is aligned with said first ferromagnetic element along a first alignment direction parallel to the optical axis, and a second electromagnet, which is mechanically constrained to said first support base and is aligned with said second ferromagnetic element along a second alignment direction parallel to said optical axis;
wherein said first drive member also comprises an electrical power supplier electrically connected to said first electromagnet and to said second electromagnet;
wherein said electrical power supplier is configured for power supplying said first electromagnet and said second electromagnet with a first variable supply voltage and a second variable power supply voltage, respectively, so as to generate a first magnetic field and a second magnetic field for attracting or repulsing said first magnetic ferromagnetic element and said second ferromagnetic element, respectively.

10. The adaptative optical device of claim 1, wherein said first movement member and said second movement member are connected to each other by at least one thread with shape memory;
wherein said at least one thread with shape memory is extended, along said first direction, between a first thread end, fixed to said first movement member, and a second thread end, fixed to said second movement member;
wherein said first drive member comprises a variable electrical power supplier which is electrically connected to said at least one thread with shape memory and is adapted to apply to said at least one thread with shape memory an electric current that is suitable for adjusting a length of said at least one thread with shape memory.

* * * * *